United States Patent
Mao et al.

(10) Patent No.: US 12,321,425 B2
(45) Date of Patent: Jun. 3, 2025

(54) IDENTITY VERIFICATION METHOD AND APPARATUS, AND ELECTRONIC DEVICE

(71) Applicant: Huawei Technologies Co., Ltd., Shenzhen (CN)

(72) Inventors: Yanyan Mao, Wuhan (CN); Xiaochen Chen, Shanghai (CN); Yunfei Qi, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 312 days.

(21) Appl. No.: 17/909,256

(22) PCT Filed: Mar. 3, 2021

(86) PCT No.: PCT/CN2021/078948
§ 371 (c)(1),
(2) Date: Sep. 2, 2022

(87) PCT Pub. No.: WO2021/175266
PCT Pub. Date: Sep. 10, 2021

(65) Prior Publication Data
US 2023/0091160 A1    Mar. 23, 2023

(30) Foreign Application Priority Data
Mar. 3, 2020  (CN) .......................... 202010140532.0

(51) Int. Cl.
*G06F 21/31*    (2013.01)
*G06F 3/14*    (2006.01)
*G06F 21/84*    (2013.01)

(52) U.S. Cl.
CPC ............ *G06F 21/31* (2013.01); *G06F 3/1454* (2013.01); *G06F 21/84* (2013.01)

(58) Field of Classification Search
CPC .......... G06F 21/31; G06F 21/84; G06F 21/32; G06F 3/1454; G06F 2221/2115; G09G 2354/00; G09G 2358/00; G09G 2370/04
See application file for complete search history.

(56) References Cited

U.S. PATENT DOCUMENTS 10,057,650 B2    8/2018    Kim et al.
10,386,890 B2    8/2019    Myung et al.
(Continued)

FOREIGN PATENT DOCUMENTS

CN    103686386 A    3/2014
CN    104239806 A    12/2014
(Continued)

*Primary Examiner* — Bruce S Ashley
(74) *Attorney, Agent, or Firm* — SLATER MATSIL, LLP

(57) ABSTRACT

A method and device for identity verification is provided. The method includes receiving a screen projection operation performed by a user to project a screen of a first electronic device onto a second electronic device, collecting, first identity verification information of the user in response to the screen projection operation, obtaining a first comparison result between the first identity verification information and second identity verification information pre-stored in the first electronic device, and displaying based on the first comparison result being consistent, a screen projection interface of the first electronic device, receiving an unlock operation performed by the user, collecting third identity verification information of the user, obtaining a second comparison result between the third identity verification information and the second identity verification information, and displaying or not displaying content based on the result of the identity verification.

19 Claims, 26 Drawing Sheets

(56) References Cited

U.S. PATENT DOCUMENTS

| | | | |
|---|---|---|---|
| 10,776,068 | B2 | 9/2020 | Hong et al. |
| 2007/0229771 | A1* | 10/2007 | Fujimori ................ G06F 21/84 |
| | | | 353/40 |
| 2012/0166997 | A1 | 6/2012 | Cho et al. |
| 2012/0216260 | A1* | 8/2012 | Crawford ................ G06F 21/31 |
| | | | 726/5 |
| 2013/0055109 | A1 | 2/2013 | Takamura et al. |
| 2013/0194633 | A1* | 8/2013 | Takatsu ................ G06F 3/1288 |
| | | | 358/1.15 |
| 2014/0282059 | A1 | 9/2014 | Oh et al. |
| 2014/0310414 | A1* | 10/2014 | Reeves ................ H04L 63/0884 |
| | | | 709/225 |
| 2014/0359493 | A1 | 12/2014 | Hong et al. |
| 2017/0289807 | A1 | 10/2017 | Mendonca et al. |
| 2019/0239069 | A1 | 8/2019 | Toyota |
| 2019/0265938 | A1 | 8/2019 | Kim et al. |
| 2019/0347216 | A1* | 11/2019 | Cheon .................... H04L 63/08 |
| 2021/0314309 | A1* | 10/2021 | Lee ...................... H04L 63/0892 |

FOREIGN PATENT DOCUMENTS

| | | | |
|---|---|---|---|
| CN | 105512086 | A | 4/2016 |
| CN | 106127876 | A | 11/2016 |
| CN | 106487862 | A | 3/2017 |
| CN | 106488306 | A | 3/2017 |
| CN | 107071540 | A | 8/2017 |
| CN | 108376236 | A | 8/2018 |
| CN | 108920937 | A | 11/2018 |
| CN | 109690472 | A | 4/2019 |
| CN | 110069229 | A | 7/2019 |
| JP | 2019134340 | A | 8/2019 |

* cited by examiner

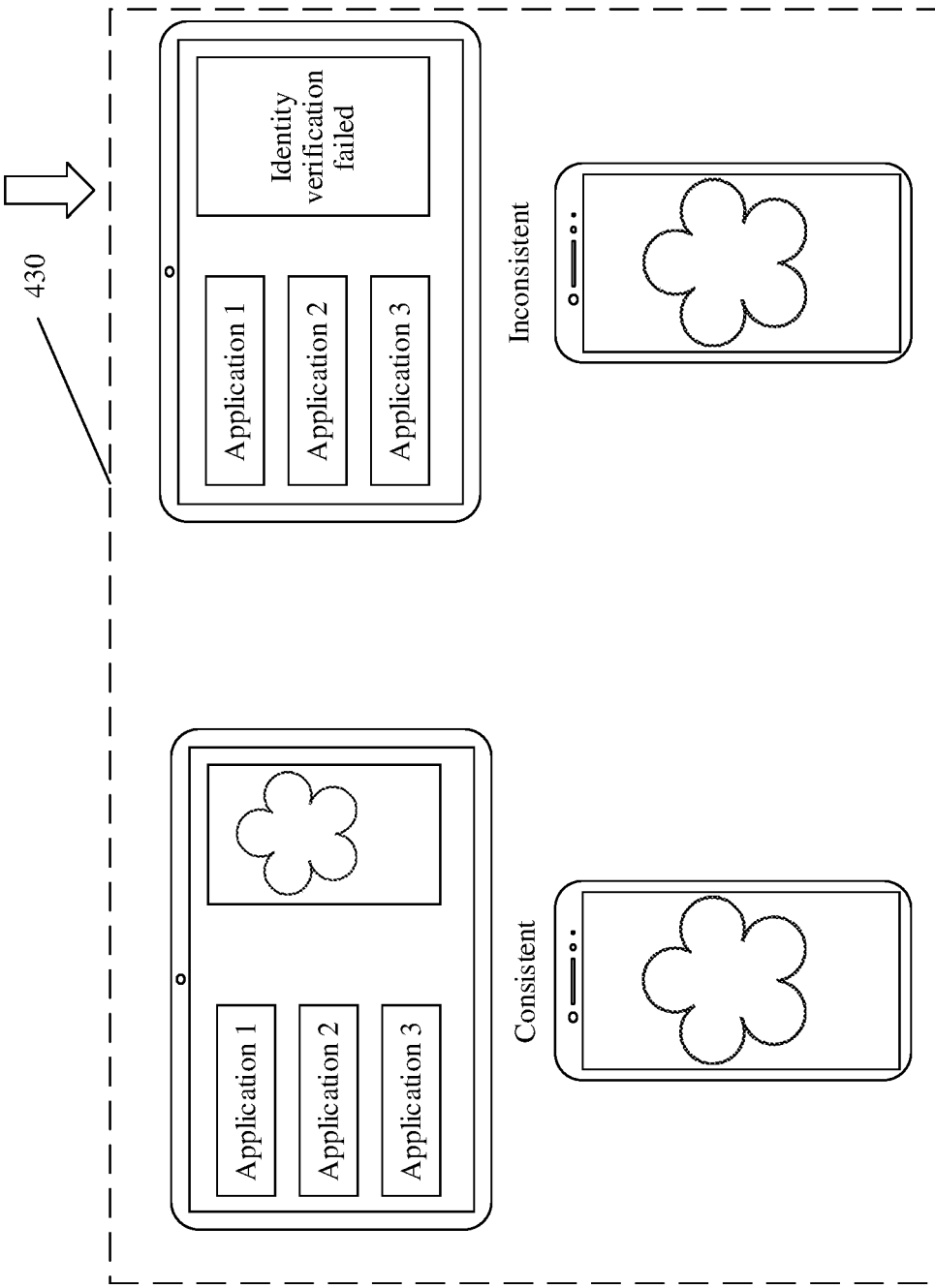

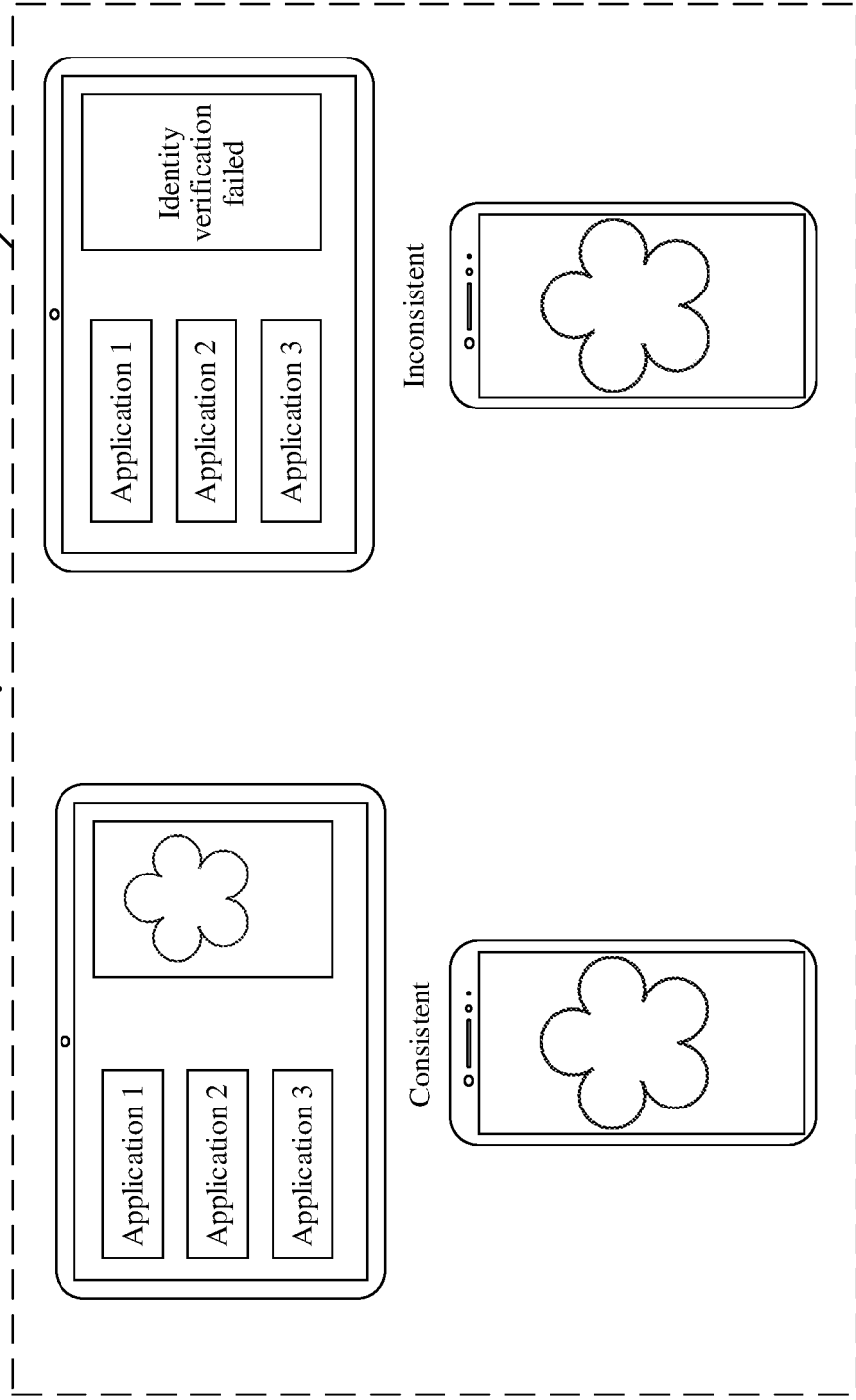

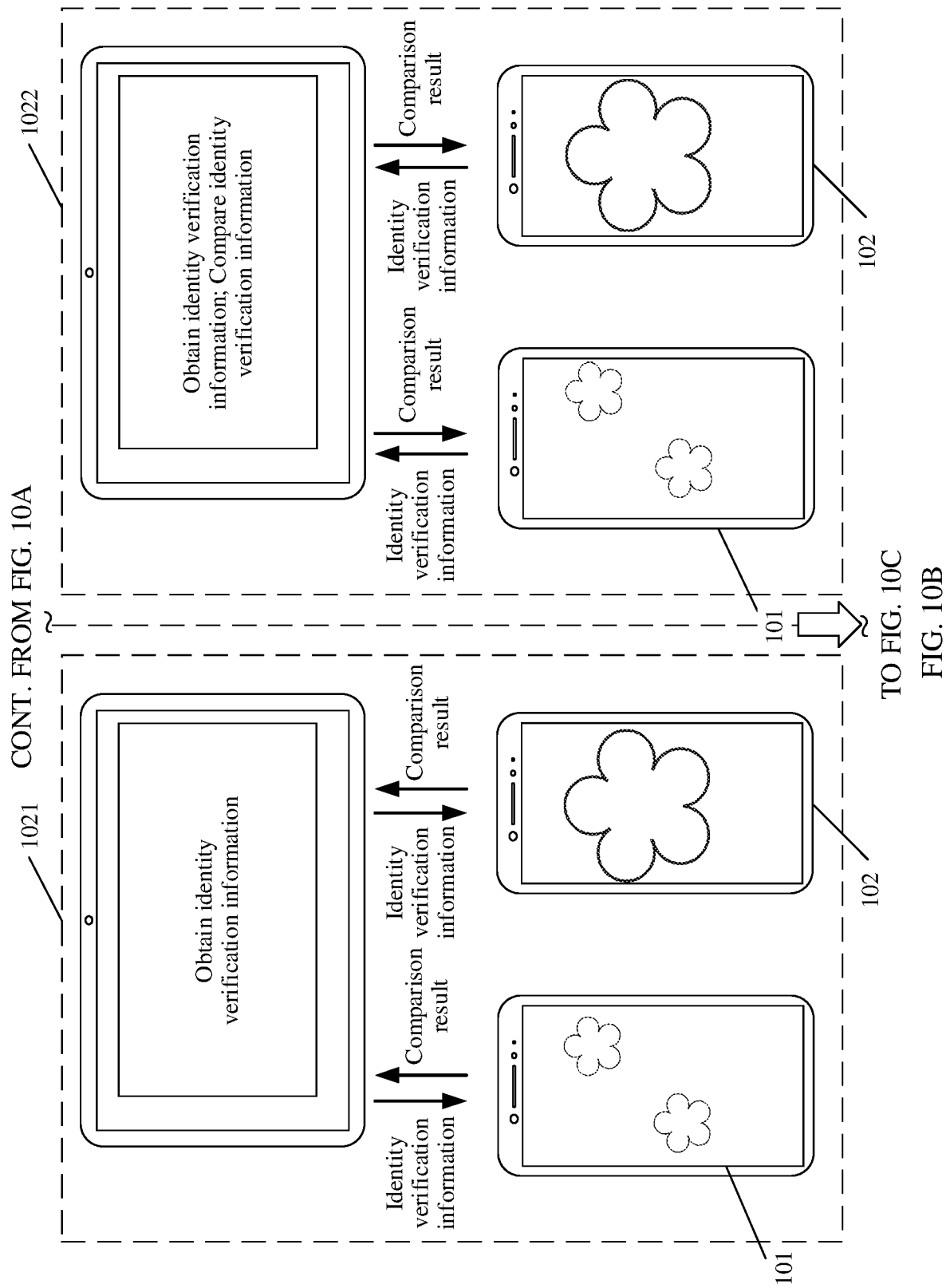

IDENTITY VERIFICATION METHOD AND APPARATUS, AND ELECTRONIC DEVICE

CROSS-REFERENCE TO RELATED APPLICATIONS

This application is a national stage of International Application No. PCT/CN2021/078948, filed on Mar. 3, 2021, which claims priority to Chinese Patent Application No. 202010140532.0, filed on Mar. 3, 2020. Both of the aforementioned applications are hereby incorporated by reference in their entireties.

TECHNICAL FIELD

This application relates to the field of intelligent terminal technologies, and in particular to an identity verification method and apparatus, and an electronic device.

BACKGROUND

In the Internet era, a user usually has a plurality of electronic devices, such as a mobile phone, a PAD, a PC, a wearable device, an electronic large-screen display, and a television. When the user projects a screen of a first electronic device (for example, a mobile phone) onto a second electronic device (for example, a PC) for display, an identity verification process is added to ensure user information security.

Refer to FIG. 1A and FIG. 1B. An example in which a screen of a mobile phone is projected onto a PC is taken. A screen projection process is as follows: A user taps a screen projection key displayed on the mobile phone to start screen projection, and the mobile phone sends a screen projection request to the PC; the PC generates a verification code based on the screen projection request and displays the verification code to the user (for example, 0088 shown in FIG. 1A). Correspondingly, the mobile phone pops up a dialog box to indicate the user to enter the verification code; the mobile phone sends the verification code (for example, 0088 shown in FIG. 1B) entered by the user to the PC. If the verification code generated by the PC is consistent with the verification code entered by the user, the mobile phone transmits interface data to the PC, and the PC displays an interface of the mobile phone on a screen.

The identity verification process in the conventional technology is complex to operate.

SUMMARY

Embodiments of this application provide an identity verification method and apparatus, and electronic devices, to conveniently complete identity verification during screen projection.

According to a first aspect, an embodiment of this application provides an information verification method, including: receiving a screen projection operation performed by a user to project a screen of a first electronic device onto a second electronic device. The electronic device includes but is not limited to a mobile phone, a computer, a PAD, a wearable device, an electronic large-screen display, a home device like a television or a refrigerator, an unmanned aerial vehicle, an automobile, and a vehicle-mounted device like a navigation device, and the screen projection refers to transmitting interface data on the first electronic device to the second electronic device for display; collecting, by the second electronic device, first identity verification information of the user in response to the screen projection operation. The identity verification information includes but is not limited to biometric feature information such as face information, fingerprint information, and iris information, a password, and the like; obtaining a first comparison result between the first identity verification information and second identity verification information pre-stored in the first electronic device; and if the first comparison result is consistent, displaying, by the second electronic device, a screen projection interface of the first electronic device.

In the method, the user can conveniently complete the identity verification during the screen projection without entering the identity verification information on the first electronic device.

Optionally, the obtaining a first comparison result between the first identity verification information and second identity verification information includes: sending, by the second electronic device, the first identity verification information to the first electronic device; and receiving, by the second electronic device, the first comparison result between the first identity verification information sent by the first electronic device and the second identity verification information.

Optionally, the obtaining a first comparison result between the first identity verification information and second identity verification information includes: receiving, by the second electronic device, the second identity verification information sent by the first electronic device; and comparing, by the second electronic device, the first identity verification information with the second identity verification information.

Optionally, the obtaining a first comparison result between the first identity verification information and second identity verification information includes: sending, by the second electronic device, the first identity verification information to a third electronic device; and receiving, by the second electronic device, the first comparison result between the first identity verification information sent by the third electronic device and the second identity verification information.

Optionally, when the screen of the first electronic device is projected onto the second electronic device, if the first electronic device is in a screen-locked state, the method further includes: receiving, by the second electronic device, an unlock operation of the user, where the unlock operation may be an unlock operation of the user on the second electronic device, or an unlock operation of the user on the screen projection interface of the second electronic device; collecting, by the second electronic device, third identity verification information of the user; obtaining a second comparison result between the third identity verification information and the second identity verification information; and if the second comparison result is consistent, displaying, by the second electronic device, the screen projection interface of the first electronic device; or if the second comparison result is inconsistent, skipping displaying, by the second electronic device, the screen projection interface of the first electronic device.

By performing the foregoing steps, when the first electronic device is in the screen-locked state, the first electronic device can be unlocked by the second electronic device. In a process, identity verification for unlocking the first electronic device can be conveniently realized without requiring the user to enter the identity verification information on the first electronic device.

When both the second electronic device and the first electronic device are in the screen-locked state, in a possible design solution, the second electronic device first collects the identity verification information of the user, where the identity verification information is used for the identity verification for unlocking the second electronic device; and then collects the identity verification information of the user, where the identity verification information is used for the identity verification for unlocking the first electronic device. This specifically includes: collecting, by the second electronic device, fourth identity verification information of the user in response to the unlock operation; comparing, by the second electronic device, the fourth identity verification information with fifth identity verification information pre-stored in the second electronic device to obtain a third comparison result; and if the third comparison result is consistent, unlocking the second electronic device; or if the third comparison result is inconsistent, skipping unlocking the second electronic device.

When both the second electronic device and the first electronic device are in the screen-locked state, in another possible design solution, the second electronic device collects the identity verification information of the user only once, and the identity verification information is used for the identity verification for unlocking the first electronic device and the identity verification for unlocking the second electronic device. This specifically includes: comparing, by the second electronic device, the third identity verification information with the fifth identity verification information pre-stored in the second electronic device in response to the unlock operation, to obtain a fourth comparison result; and if the fourth comparison result is consistent, unlocking the second electronic device; or if the fourth comparison result is inconsistent, skipping unlocking the second electronic device.

Optionally, after receiving the screen projection operation, and before collecting the first identity verification information, the method further includes: obtaining, by the second electronic device, a type of the second identity verification information.

The second electronic device obtains the type of the second identity verification information, and collects the identity verification information of the corresponding type, so that accurate comparison data can be provided for subsequent identity verification information comparison, and efficiency and accuracy of the identity verification can be improved.

Optionally, after receiving the screen projection operation, and before collecting the first identity verification information, the method further includes: determining, by the second electronic device, that a distance between the second electronic device and the first electronic device is less than a preset threshold.

This step ensures that the first electronic device is located near the second electronic device, which improves security of projecting the screen of the first electronic device onto the second electronic device.

Optionally, the method further includes: determining, by the second electronic device, whether the second electronic device is directly connected to the first electronic device; and if the second electronic device is not directly connected to the first electronic device, establishing, by the second electronic device, a direct connection between the second electronic device and the first electronic device.

That the second electronic device is directly connected to the first electronic device means that data is directly transmitted between the second electronic device and the first electronic device via Bluetooth, WiFi, or the like. Direct connection between the second electronic device and the first electronic device can improve data transmission security between the second electronic device and the first electronic device.

According to a second aspect, an embodiment of this application provides a first electronic device, including: a display, one or more processors, a memory, and one or more computer programs, where the one or more computer programs are stored in the memory, the one or more computer programs include instructions, and when the instructions are executed by the first electronic device, the first electronic device is enabled to perform the following steps: receive a screen projection operation of a user; send a screen projection request to a second electronic device; receive first identity verification information sent by the second electronic device, where the first identity verification information is collected by the second electronic device in response to the screen projection request; compare the first identity verification information with second identity verification information pre-stored in the first electronic device, to obtain a first comparison result; and if the first comparison result is consistent, send interface data to the second electronic device.

Optionally, when the instructions are executed by the first electronic device, the first electronic device is enabled to further perform the following steps: receive third identity verification information of the user sent by the second electronic device, where the third identity verification information is collected by the second electronic device in response to an unlock operation of the user; compare the third identity verification information with the second identity verification information, to obtain a second comparison result; and if the second comparison result is consistent, send the interface data to the second electronic device.

Optionally, when the instructions are executed by the first electronic device, the first electronic device is enabled to further perform the following steps: determine whether the first electronic device is directly connected to the second electronic device; and if the first electronic device is not directly connected to the second electronic device, establish a direct connection between the first electronic device and the second electronic device.

According to a third aspect, an embodiment of this application provides a second electronic device, including: a display, one or more processors, a memory, and one or more computer programs, where the one or more computer programs are stored in the memory, the one or more computer programs include instructions, and when the instructions are executed by the second electronic device, the second electronic device is enabled to perform the method according to the first aspect.

According to a fourth aspect, an embodiment of this application provides a computer program. When the computer program is executed by a computer, the computer is used to perform the method according to the first aspect.

In a possible design, the program in the fourth aspect may be all or partially stored in a storage medium packaged with a processor, or may be all or partially stored in a memory that is not packaged with the processor.

BRIEF DESCRIPTION OF THE DRAWINGS

To describe technical solutions in embodiments of the present invention more clearly, the following briefly introduces the accompanying drawings used in describing the embodiments. It is clearly that the accompanying drawings in the following descriptions show merely some embodiments of the present invention, and a person of ordinary skill

FIG. 5A and FIG. 5B are a flowchart of still another embodiment of an identity verification method according to this application;

FIG. 6A and FIG. 6B are a flowchart of yet another embodiment of an identity verification method according to this application;

FIG. 10A to FIG. 10C are a flowchart of a yet further embodiment of an identity verification method according to this application;

DETAILED DESCRIPTION OF ILLUSTRATIVE EMBODIMENTS

Terms used in embodiments of this application are only used for explaining specific embodiments of this application, but are not intended to limit this application.

In embodiments of this application, "screen projection" means transmitting interface data on one electronic device to another electronic device for display. For ease of description, in embodiments of this application, the foregoing "one electronic device" is referred to as a "first electronic device", the foregoing "another electronic device" is referred to as a "second electronic device", and an interface displayed on the second electronic device after the screen projection of the first electronic device is referred to as a "screen projection interface". It should be noted that a screen projection function may be provided by a system, or may be provided by an application. This is not limited in embodiments of this application.

In embodiments of this application, the second electronic device may only have a display right on the screen projection interface, but does not have a data management right. For example, the second electronic device cannot open a link on the screen projection interface or input data. Alternatively, the second electronic device may have some or all data management rights on the screen projection interface, for example, can open the link on the screen projection interface or input data. This is not limited in this application.

In embodiments of this application, the two electronic devices that perform the screen projection may be directly connected to each other. For example, the two electronic devices are directly connected to each other via Bluetooth or WiFi. Alternatively, the two electronic devices may be indirectly connected to each other via a cloud server. In a screen projection process, a connection between two electronic devices may be switched between a direct connection and an indirect connection. This is not limited in this application.

Figure 1A:
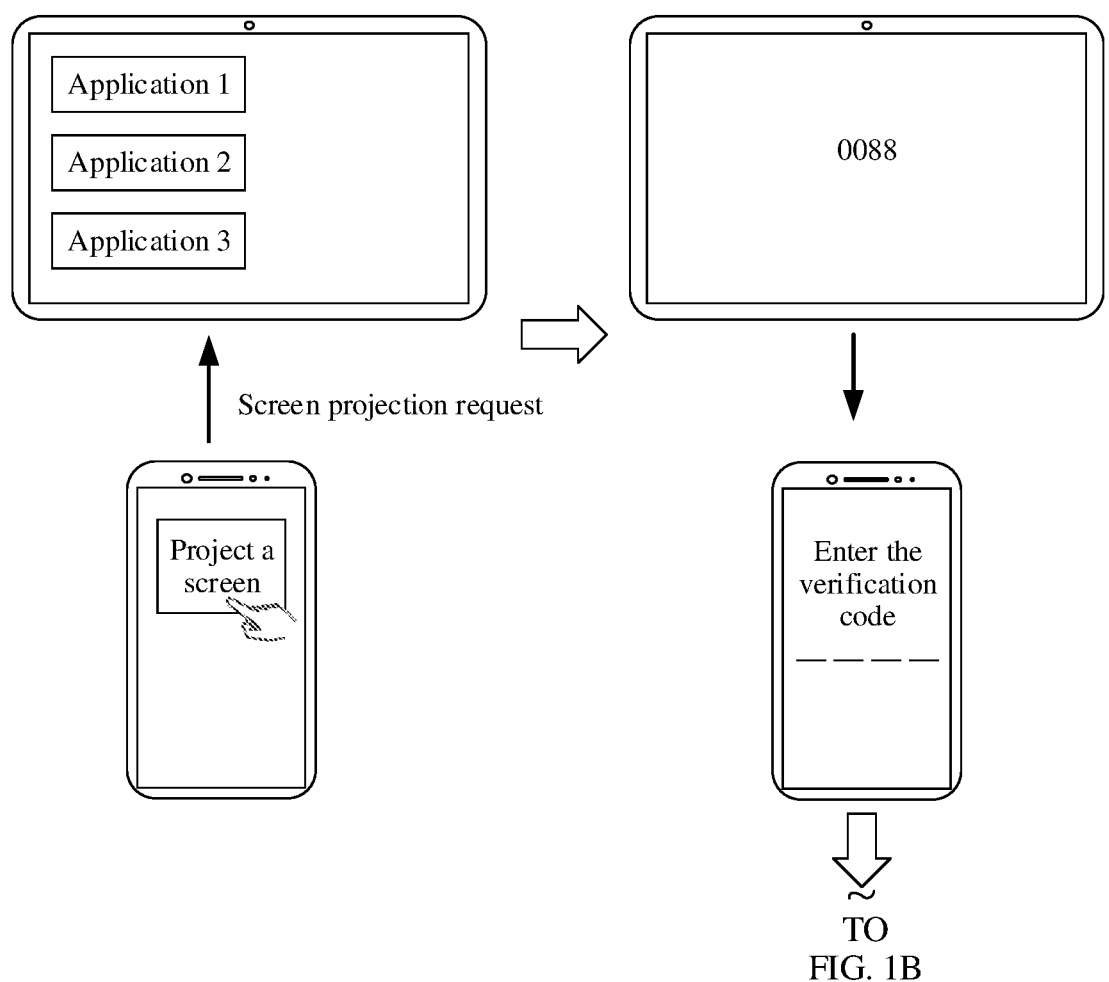
FIG. 1A and FIG. 1B are a schematic diagram of a screen projection process in the conventional technology.
Figure 1B:
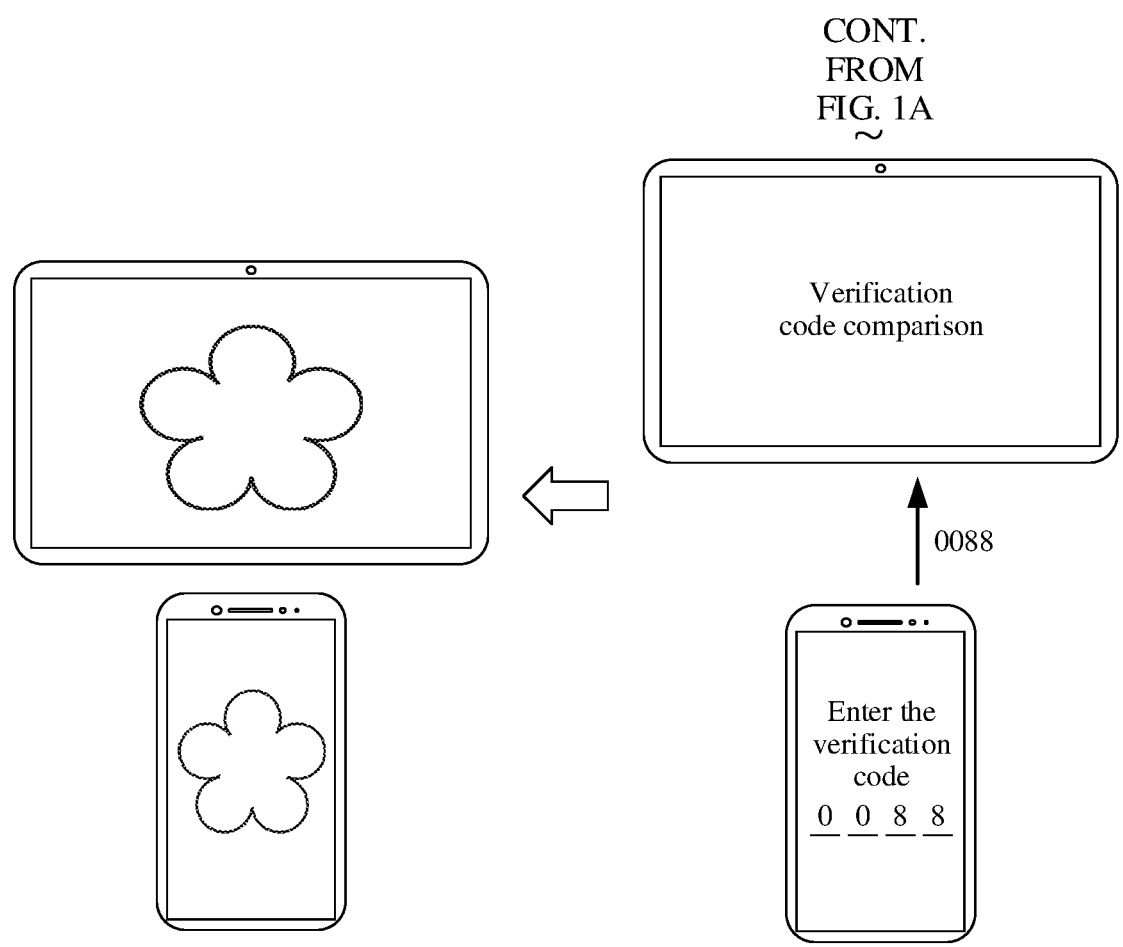
Figure 2A:
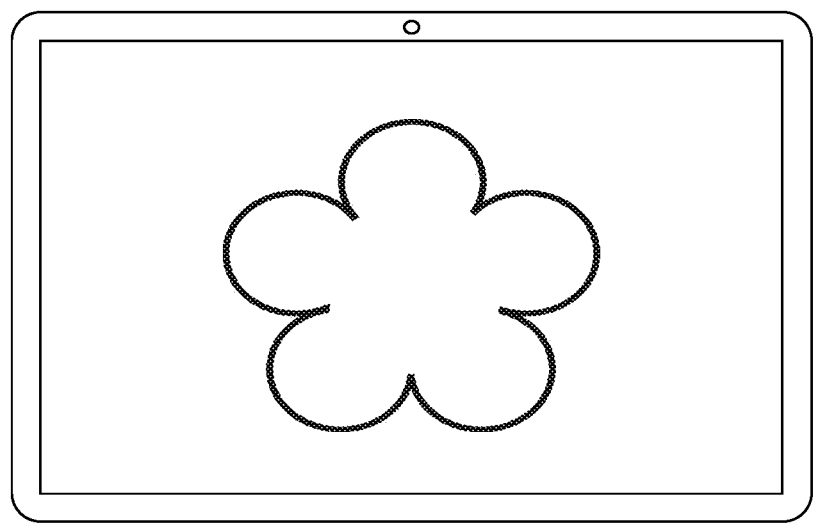
FIG. 2a is a schematic diagram of mirroring projection according to an embodiment of this application.
Figure 2A:
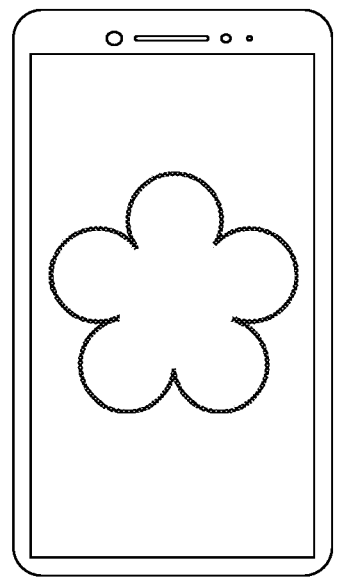
Figure 2B:
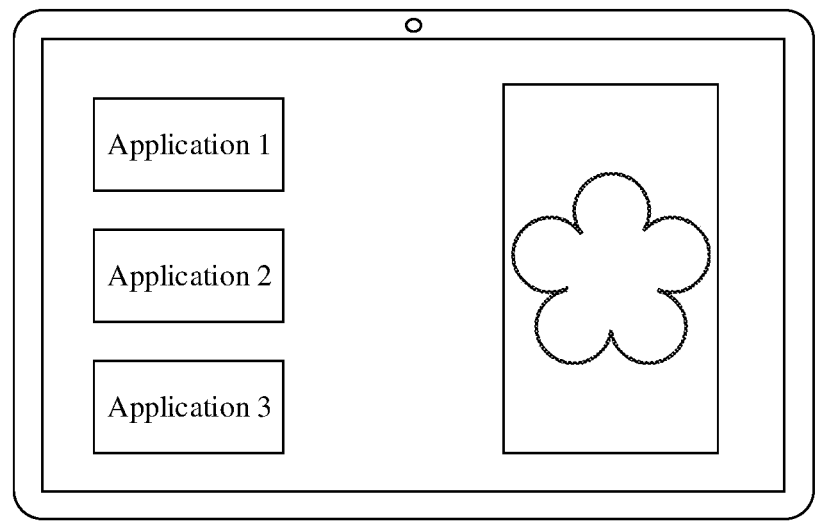
FIG. 2b is a schematic diagram of floating projection according to an embodiment of this application.
Figure 2B:
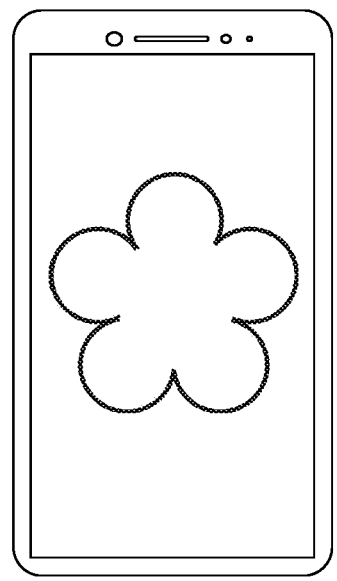

In embodiments of this application, at least the following two screen projection manners are included. Specifically, the second electronic device may display the screen projection interface in a full-screen manner, for example, as shown in FIG. 2a, which is referred to as full-screen projection below. Alternatively, the second electronic device may display, in a floating manner, the screen projection interface on a part of a display area of the second electronic device, for example, as shown in FIG. 2b, which is referred to as floating projection below. For floating projection, a user may view, via the screen of the second electronic device, an interface that needs to be displayed by the second electronic device, or view the screen projection interface projected by the first electronic device onto the second electronic device.

Figure 3:
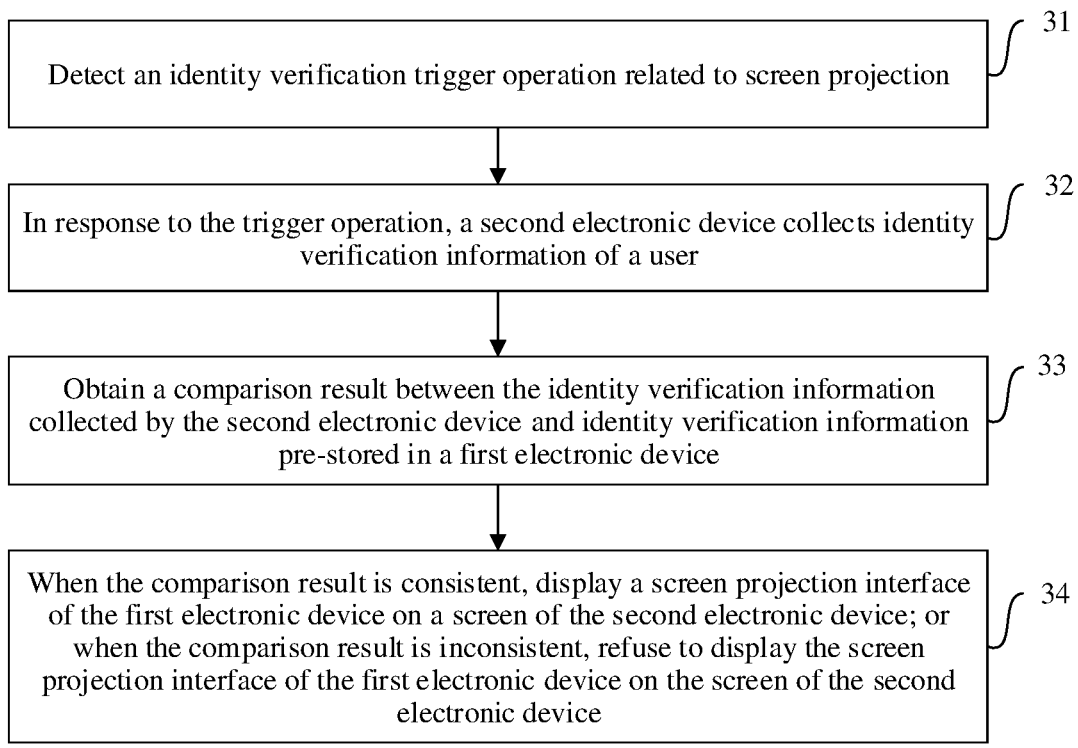
FIG. 3 is a flowchart of an embodiment of an identity verification method according to this application.

To facilitate a user operation, an embodiment of this application provides an identity verification method. FIG. 3 is a flowchart of an identity verification method according to an embodiment of this application. As shown in FIG. 3, the method may include the following steps.

Step 31: Detect an identity verification trigger operation related to screen projection.

The trigger operation may include a screen projection operation, an unlock operation during the screen projection, and the like.

Step 32: In response to the trigger operation, a second electronic device collects identity verification information of a user.

The identity verification information includes but is not limited to biometric feature information such as face information, fingerprint information, and iris information, a password, and the like.

Step 33: Obtain a comparison result between the identity verification information collected by the second electronic device and identity verification information pre-stored in a first electronic device.

The comparison between the identity verification information collected by the second electronic device and the identity verification information pre-stored in the first electronic device may be performed on the first electronic device, may be performed on the second electronic device, or may be performed on a third electronic device other than the first electronic device and the second electronic device.

Step 34: When the comparison result is consistent, display a screen projection interface of the first electronic device on a screen of the second electronic device; or when the comparison result is inconsistent, refuse to display the screen projection interface of the first electronic device on the screen of the second electronic device.

Optionally, to ensure security, after the second electronic device receives a screen projection request sent by the first electronic device, and before the second electronic device collects the identity verification information of the user, the method may further include the following steps.

The second electronic device determines whether a preset condition is met. If the preset condition is met, the second electronic device performs the step of collecting the identity verification information of the user. If the preset condition is not met, the second electronic device may refuse to display the screen projection interface of the first electronic device on the second electronic device, and prompt the user on the screen. A specific prompt manner is not limited in this application.

The preset condition may include but is not limited to one or more of the following conditions:

Identity verification is set for the first electronic device, for example, the identity verification is needed to unlock a screen or power on the first electronic device; an identity verification result of the second electronic device is consistent with an identity verification result of the first electronic device, for example, both the identity verification results of the first electronic device and the second electronic device are a user A; a distance between the second electronic device and the first electronic device is less than a preset threshold; the first electronic device has enabled a wireless connection, where the wireless connection includes but is not limited to WiFi or Bluetooth; and the second electronic device is directly connected to the first electronic device.

It should be noted that a method for obtaining the distance between the first electronic device and the second electronic device is not limited in this embodiment of this application. For example, the distance between the two electronic devices may be calculated by using latitude and longitude information of the first electronic device and latitude and longitude information of the second electronic device.

For ease of understanding, the following describes the foregoing method in detail with reference to the accompanying drawings.

Figure 4A:
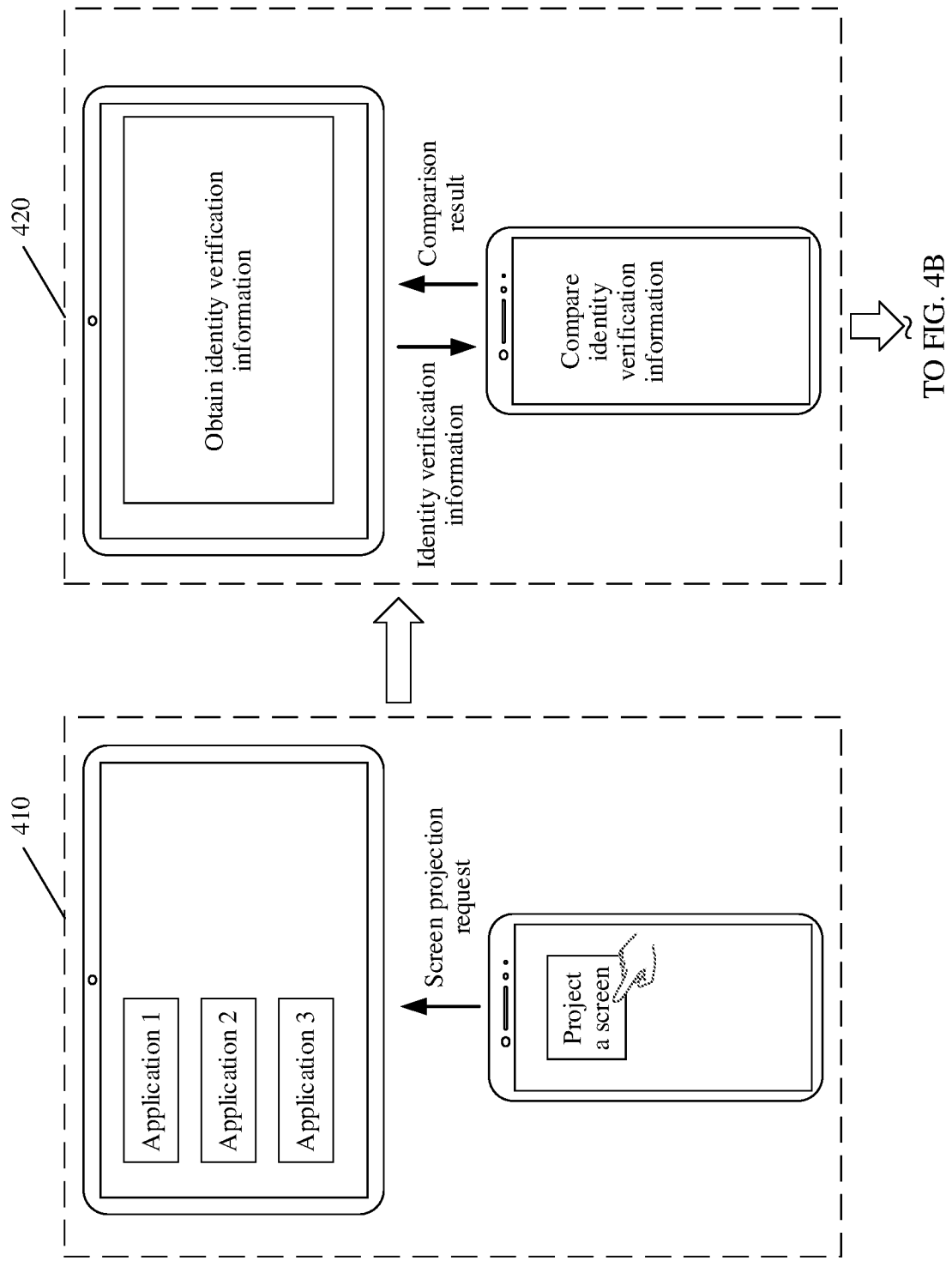
FIG. 4A and FIG. 4B are a flowchart of another embodiment of an identity verification method according to this application.
Figure 4B:
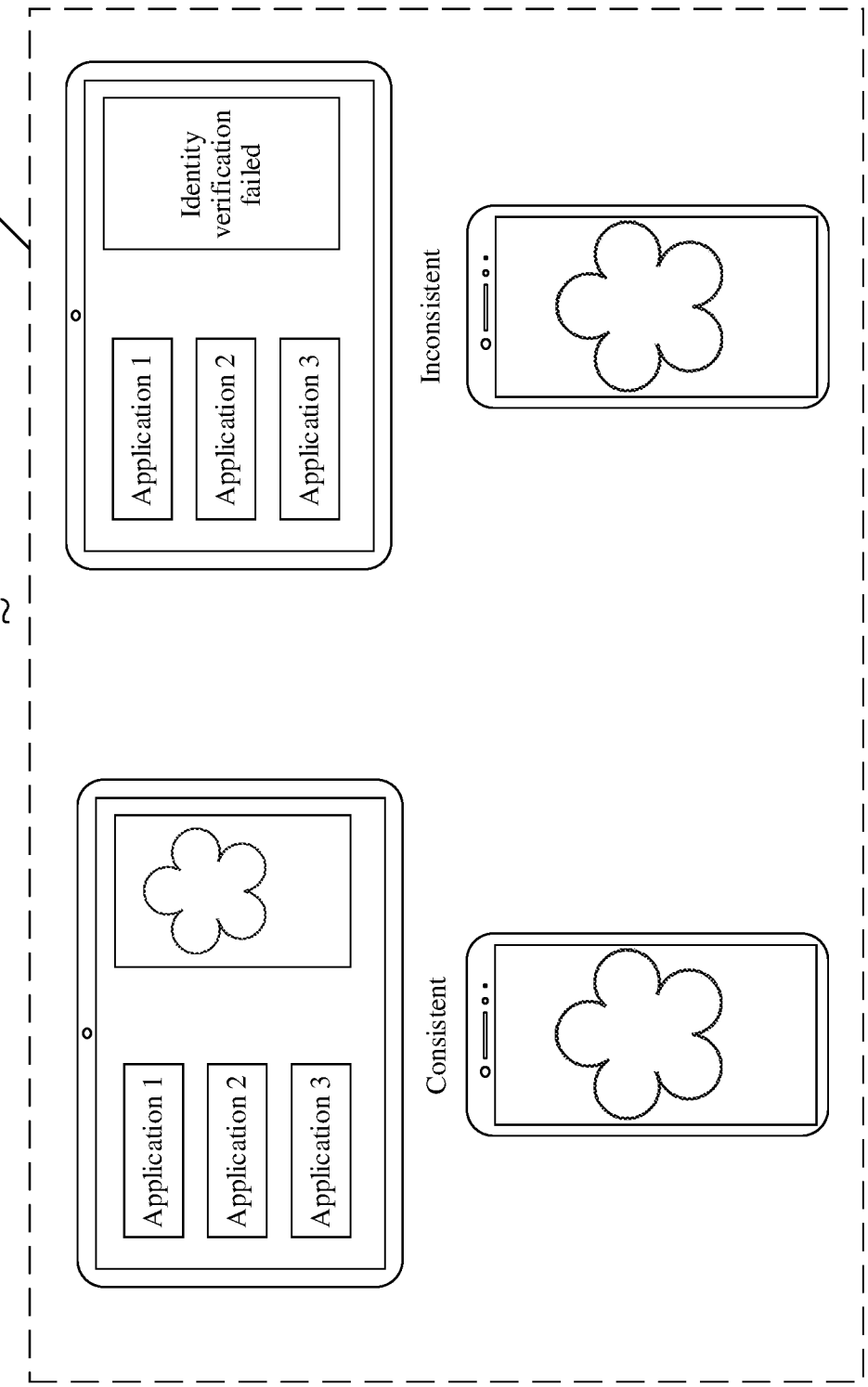

FIG. 4A and FIG. 4B are a schematic diagram of an embodiment of an identity verification method according to this application.

Refer to part 410 in FIG. 4A. A first electronic device receives a screen projection operation of a user, where the screen projection operation may be tapping of a preset screen projection key by the user. The first electronic device sends a screen projection request to a second electronic device in response to the screen projection operation. The second electronic device receives the screen projection request sent by the first electronic device, and the second electronic device triggers identity verification in response to the screen projection request. (Step 31)

Refer to part 420 in FIG. 4A. The second electronic device collects identity verification information of the user, and sends the identity verification information to the first electronic device. The first electronic device receives the identity verification information sent by the second electronic device, and compares the received identity verification information (that is, the identity verification information collected by the second electronic device) with identity verification information pre-stored in the first electronic device; and the first electronic device transmits a comparison result to the second electronic device. (Step 32 and Step 33)

For example, if a similarity between the identity verification information collected by the second electronic device and the identity verification information pre-stored in the first electronic device is greater than a preset threshold (or a difference is less than the preset threshold), the comparison result is consistent; otherwise, the comparison result indicates that they are inconsistent.

Optionally, to ensure that the identity verification information collected by the second electronic device is more targeted, before the second electronic device collects the identity verification information of the user, the method may further include:

The second electronic device obtains a type of the identity verification information pre-stored in the first electronic device; and correspondingly, the second electronic device collects the identity verification information of the type.

That is, for example, if the identity verification information pre-stored in the first electronic device is facial information, the identity verification information collected by the second electronic device is facial information as well. The second electronic device collects the identity verification information of the corresponding type, so that accurate comparison data can be provided for subsequent comparison of the identity verification information, which improves efficiency and accuracy of the identity verification.

Optionally, the screen projection request sent by the first electronic device may include the type of the identity verification information pre-stored in the first electronic device, and the second electronic device may obtain, from the screen projection request, the type of the identity verification information pre-stored in the first electronic device. It should be noted that a method for obtaining the type of the identity verification information pre-stored in the first electronic device is not limited thereto.

Optionally, to improve transmission security of the identity verification information, the second electronic device may encrypt the identity verification information of the user and then send the encrypted identity verification information to the first electronic device. Correspondingly, the first electronic device may decrypt received data, to obtain the identity verification information of the user. A specific encryption and decryption method is not limited in this embodiment of this application.

Refer to part 430 in FIG. 4B. When the comparison result obtained by the second electronic device is consistent, the second electronic device displays the screen projection interface of the first electronic device on a screen.

Optionally, the screen projection request may include a projection manner, for example, floating projection or full-screen projection. In this case, the second electronic device may display the screen projection interface based on the screen projection manner included in the screen projection request. As shown in part 430 in FIG. 4B, the screen projection manner is the floating projection.

When the comparison result received by the second electronic device is inconsistent, the second electronic device may reject the screen projection request for projecting the screen from the first electronic device to the second electronic device. Optionally, the second electronic device may display a prompt indicating that the identity verification fails, as shown in part 430 in FIG. 4B. It should be noted that a prompt manner of an identity verification failure is not limited in this embodiment of this application, provided that the user can learn of information indicating that the identity verification fails. For example, the second electronic device may further prompt, by popping up a prompt box, that the identity verification fails.

Figure 5A:
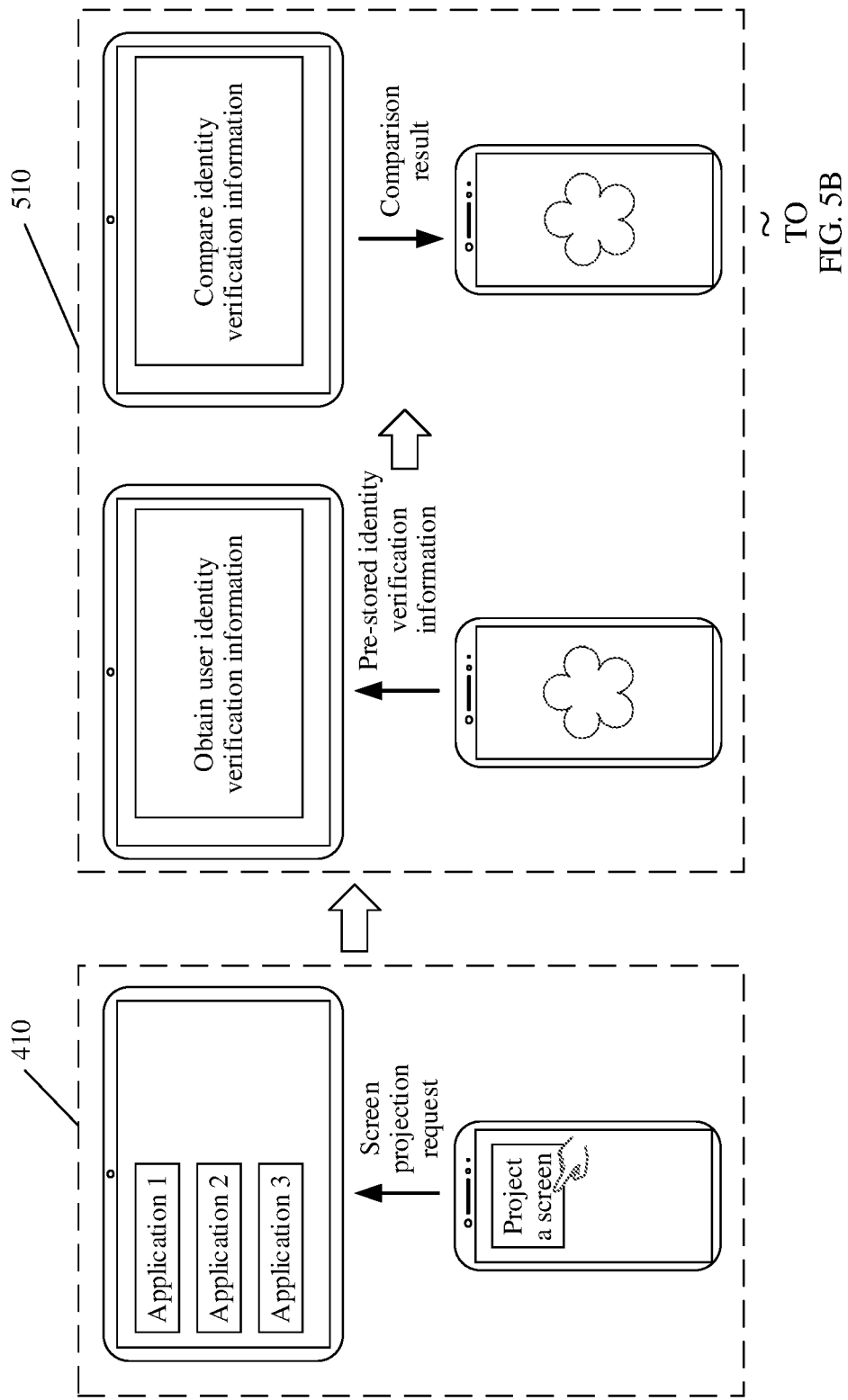

Different from the embodiment shown in FIG. 4A and FIG. 4B in which the first electronic device compares the identity verification information, in another embodiment shown in FIG. 5A and FIG. 5B, a second electronic device compares identity verification information.

Refer to part 510 in FIG. 5A. The second electronic device collects the identity verification information of a user; and the second electronic device sends an identity verification information sending request to a first electronic device. In response to the identity verification information sending request, the first electronic device sends identity verification information pre-stored in the first electronic device to the second electronic device. The second electronic device receives the identity verification information pre-stored in and sent by the first electronic device. The second electronic device compares the identity verification information collected by the second electronic device with the identity verification information pre-stored in the first electronic device, to obtain a comparison result; and sends the comparison result to the first electronic device.

Optionally, to ensure transmission security of the identity verification information pre-stored in the first electronic device, the first electronic device may encrypt the pre-stored identity verification information and then send the encrypted identity verification information to the second electronic device. Correspondingly, the second electronic device decrypts received data, to obtain the identity verification information pre-stored in the first electronic device.

Optionally, to ensure security of identity information pre-stored in the first electronic device, virtual identity verification information may be used to replace the identity verification information pre-stored in the first electronic device to perform identity verification. Specifically, the first electronic device may generate the virtual identity verification information based on the pre-stored identity verification information, and send the virtual identity verification information to the second electronic device. The second electronic device performs the identity verification based on the received virtual identity verification information.

Figure 6A:
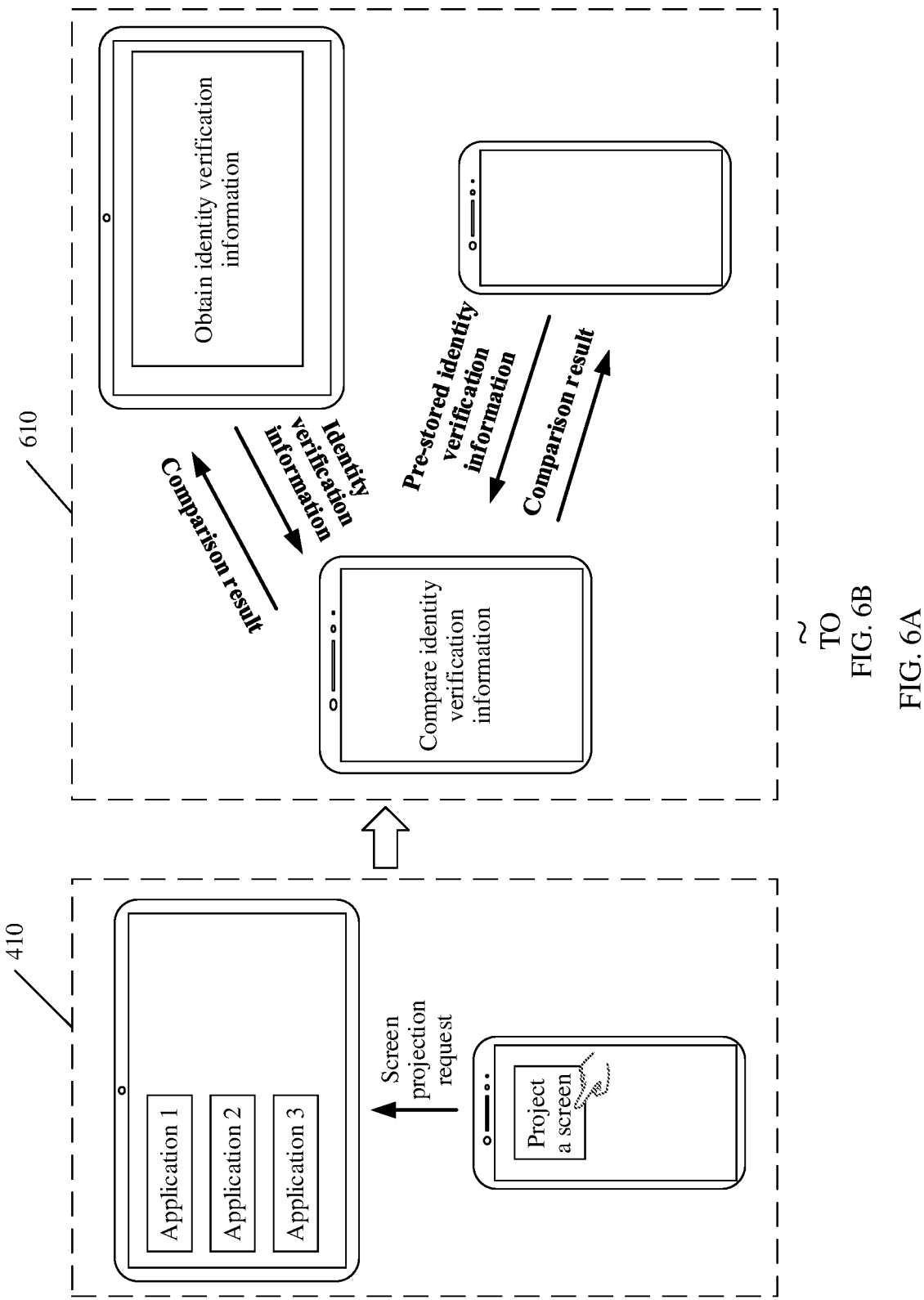

Different from the embodiment shown in FIG. 4A and FIG. 4B in which the first electronic device compares the identity verification information, and the embodiment shown in FIG. 5A and FIG. 5B in which the second electronic device compares the identity verification information, in another embodiment shown in FIG. 6A and FIG. 6B, a third electronic device compares identity verification information.

Refer to part 610 in FIG. 6A. A second electronic device collects the identity verification information of a user, and sends the collected identity verification information to the third electronic device. The third electronic device sends an identity verification information sending request to a first electronic device. The first electronic device sends pre-stored identity verification information to the third electronic device in response to the identity verification information sending request. The third electronic device receives the identity verification information pre-stored in and sent by the first electronic device, and the third electronic device compares the identity verification information collected by the second electronic device with the identity verification information pre-stored in the first electronic device, to obtain a comparison result, and sends the comparison result to the first electronic device and/or the second electronic device.

The third electronic device is connected to the first electronic device, and is connected to the second electronic device. The third electronic device may be a server, or may be another electronic device. This is not limited in this embodiment of this application.

Optionally, the first electronic device and the second electronic device may send encrypted identity verification information to the third electronic device; or the first electronic device and the second electronic device may send virtual identity verification information to the third electronic device. For details, refer to related descriptions in FIG. 4A and FIG. 4B and FIG. 5A and FIG. 5B. The details are not described herein again.

Figure 7:
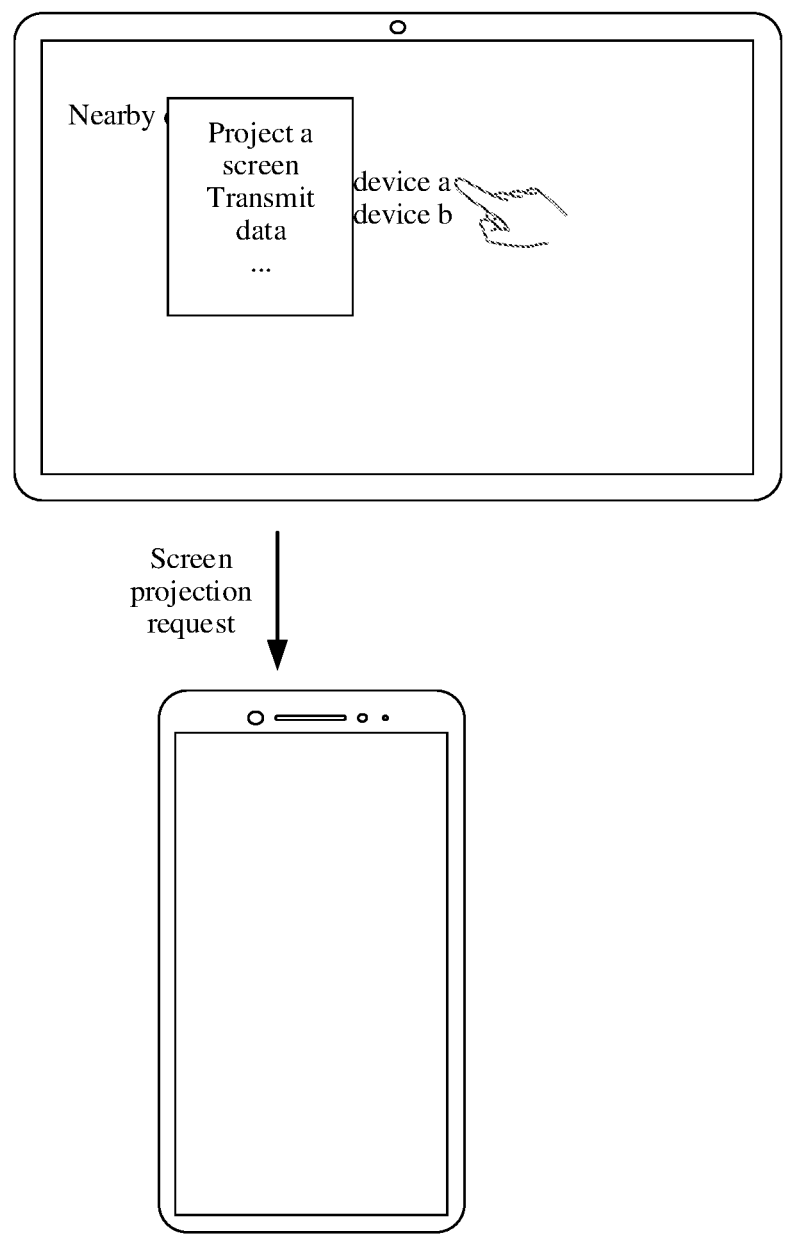
FIG. 7 is a flowchart of still yet another embodiment of an identity verification method according to this application.

In embodiments shown in FIG. 4A and FIG. 4B to FIG. 6A and FIG. 6B, an example is taken for description, in which the first electronic device receives the screen projection operation of the user, and the first electronic device sends the screen projection request to the second electronic device to trigger the identity verification. It may be understood that the second electronic device may receive the screen projection operation of the user, and then trigger the identity verification. Specifically:

Refer to FIG. 7. A second electronic device displays a nearby device list; and the second electronic device receives a screen projection operation of a user, for example, the user selects, from the nearby device list, a first electronic device to perform screen projection. In response to the screen projection operation, the second electronic device sends a screen projection request to the first electronic device or a third electronic device, to trigger identity verification. Optionally, in response to the screen projection request, the first electronic device may send, to the second electronic device, information such as a type of identity verification information pre-stored in the first electronic device.

In embodiments shown in FIG. 4A and FIG. 4B to FIG. 7, an example is taken for description, in which the screen projection operation of projecting a screen of the first electronic device onto the second electronic device triggers the identity verification. It should be noted that, the identity verification may be further triggered by an unlock operation during the screen projection. The following provides description with reference to embodiments shown in FIG. 8A to FIG. 8C and FIG. 9A and FIG. 9B.

Figure 8A:
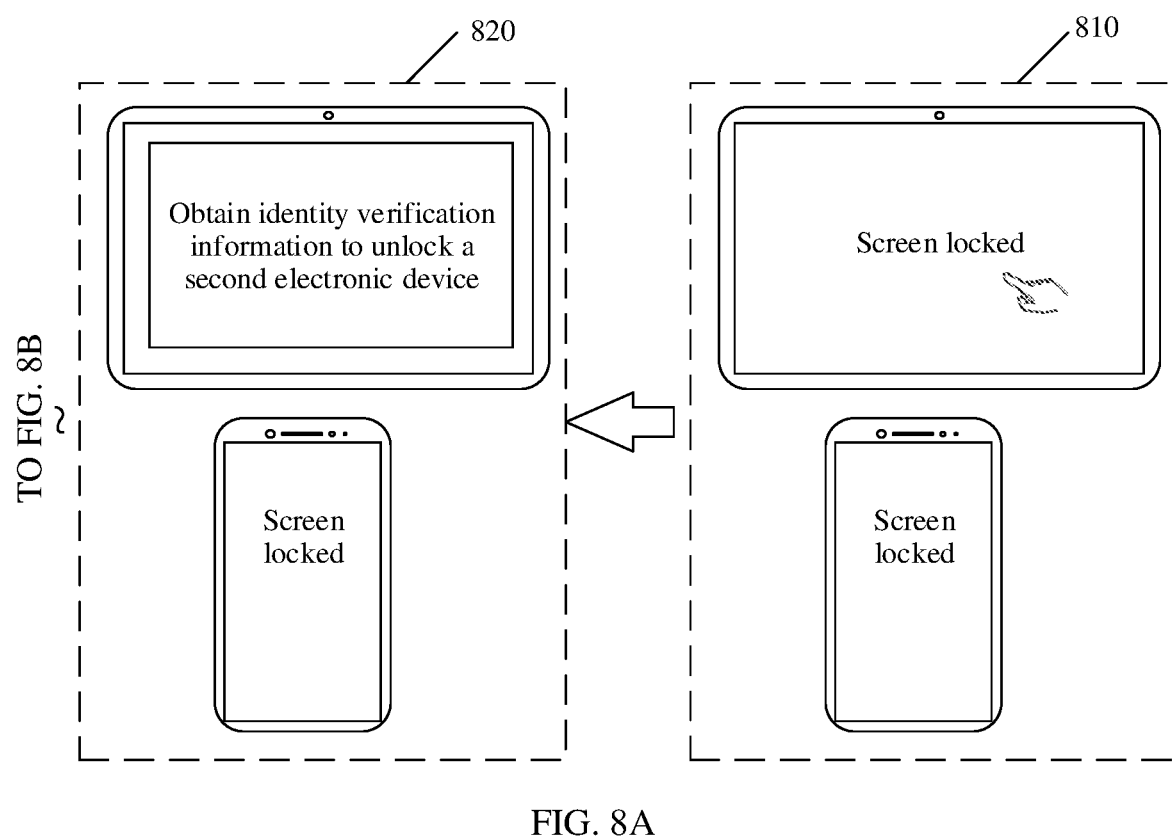
FIG. 8A to FIG. 8C are a flowchart of a further embodiment of an identity verification method according to this application.
Figure 8B:
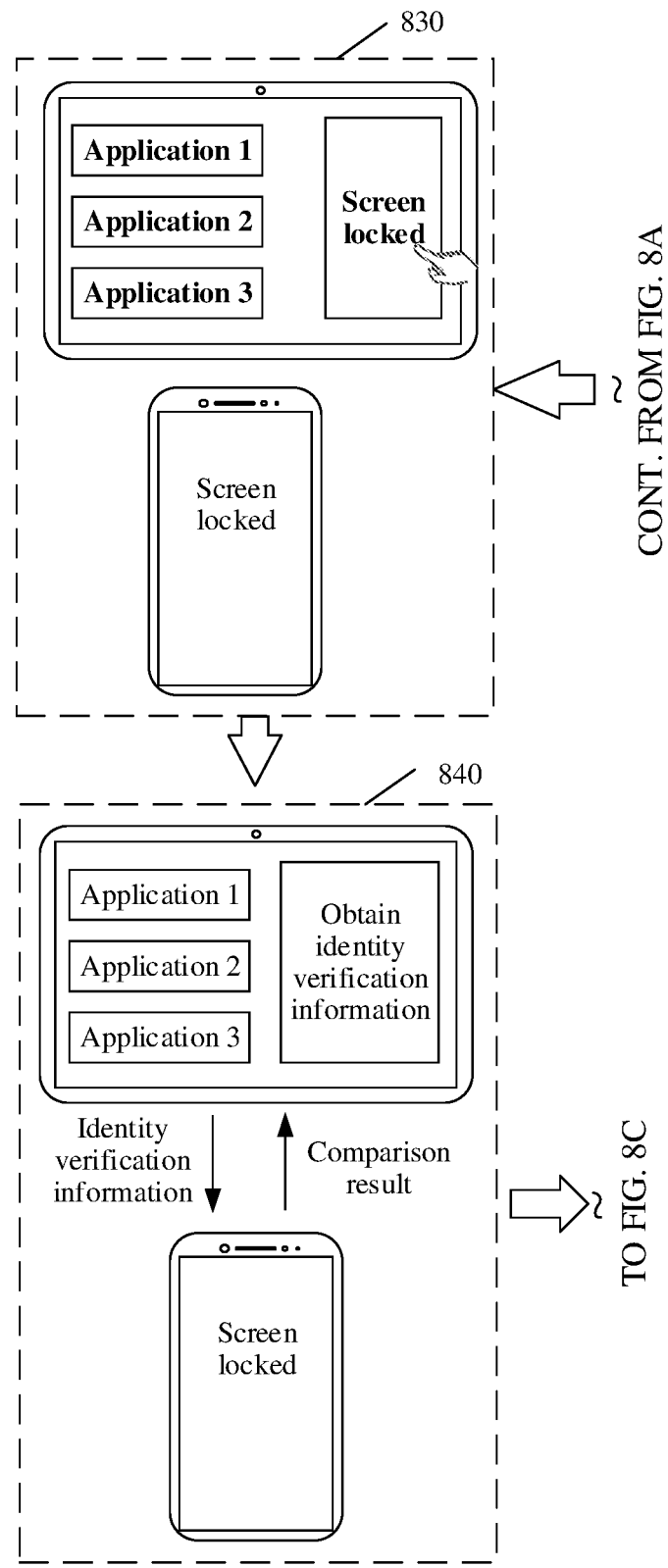
Figure 8C:
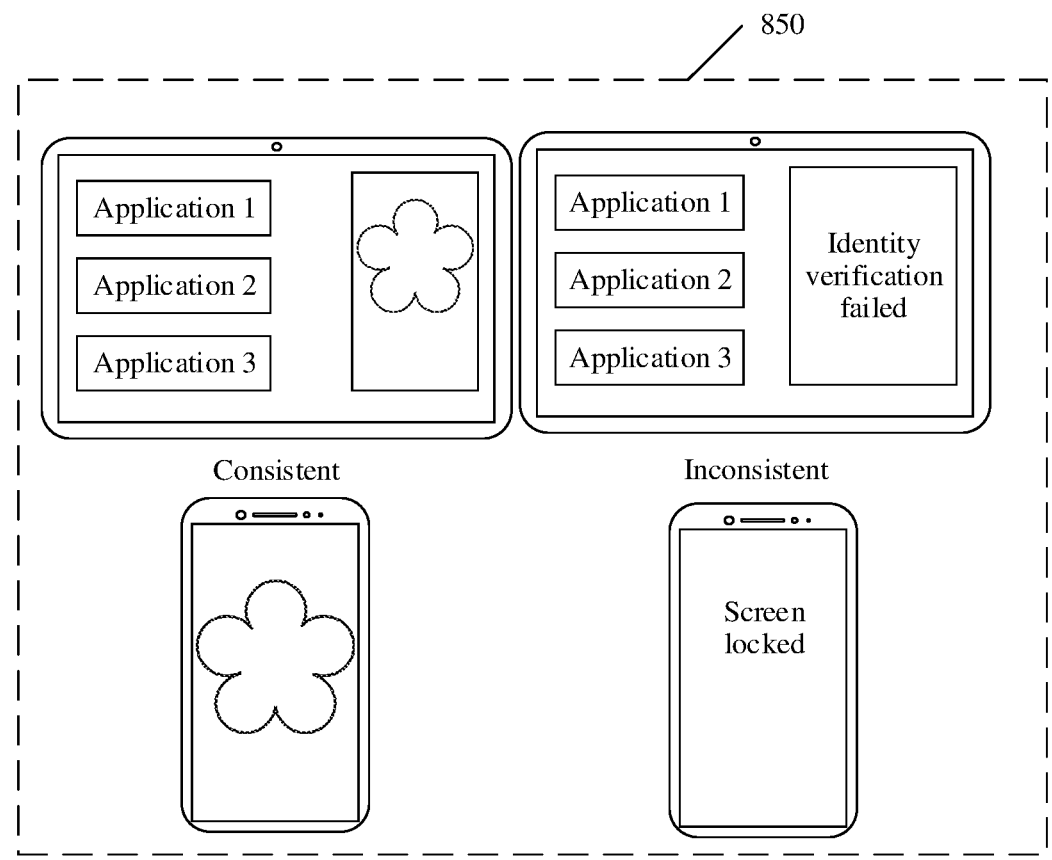

In an embodiment shown in FIG. 8A to FIG. 8C, a screen of a first electronic device has been projected onto a second electronic device, and currently both the first electronic device and the second electronic device are in a screen-locked state.

In the embodiment shown in FIG. 8A to FIG. 8C, the second electronic device and the first electronic device are unlocked in sequence. Details are as follows:

Refer to part 810 in FIG. 8A. A user performs an unlock operation on the second electronic device, to trigger identity verification of the second electronic device. For example, the unlock operation may include: the user performs a slide or tap operation or pressing an unlock key on the second electronic device. This is not limited in this embodiment of this application.

Refer to part 820 in FIG. 8A. The second electronic device collects identity verification information of the user, and compares the collected identity verification information with identity verification information pre-stored in the second electronic device, to obtain a comparison result. If the comparison result is consistent, the second electronic device is unlocked (as shown in part 830 in FIG. 8B); or if the comparison result is inconsistent, the second electronic device is not unlocked (not shown in FIG. 8A to FIG. 8C).

Refer to part 830 in FIG. 8B. After the second electronic device is unlocked, a screen projection interface (that is, the screen projection interface of the first electronic device) displayed on the second electronic device is still in a locked state, and the second electronic device may trigger the identity verification of the first electronic device in response to the unlock operation of the user on the screen projection interface. The unlock operation on the screen projection interface may be double-tapping or the like. This is not limited in this embodiment of this application. If the identity verification information collected by the second electronic device is consistent with the identity verification information pre-stored in the first electronic device, display the screen projection interface on the second electronic device; otherwise, skip displaying the screen projection interface. It should be noted that, in part 840 of FIG. 8B, it is taken as an example that the first electronic device compares the identity verification information collected by the second electronic device with the identity verification information pre-stored in the first electronic device. Optionally, the second electronic device may compare the identity verification information, or a third electronic device may compare the identity verification information. For details, refer to part 420 in FIG. 4A, part 510 in FIG. 5A, and part 610 in FIG. 6A. The details are not described herein again. In part 850 in FIG. 8C, it is taken as an example that the second electronic device displays the screen projection interface in a floating manner. Optionally, the screen projection interface may be displayed in a full-screen manner. This is not limited in this embodiment of this application.

Figure 9A:
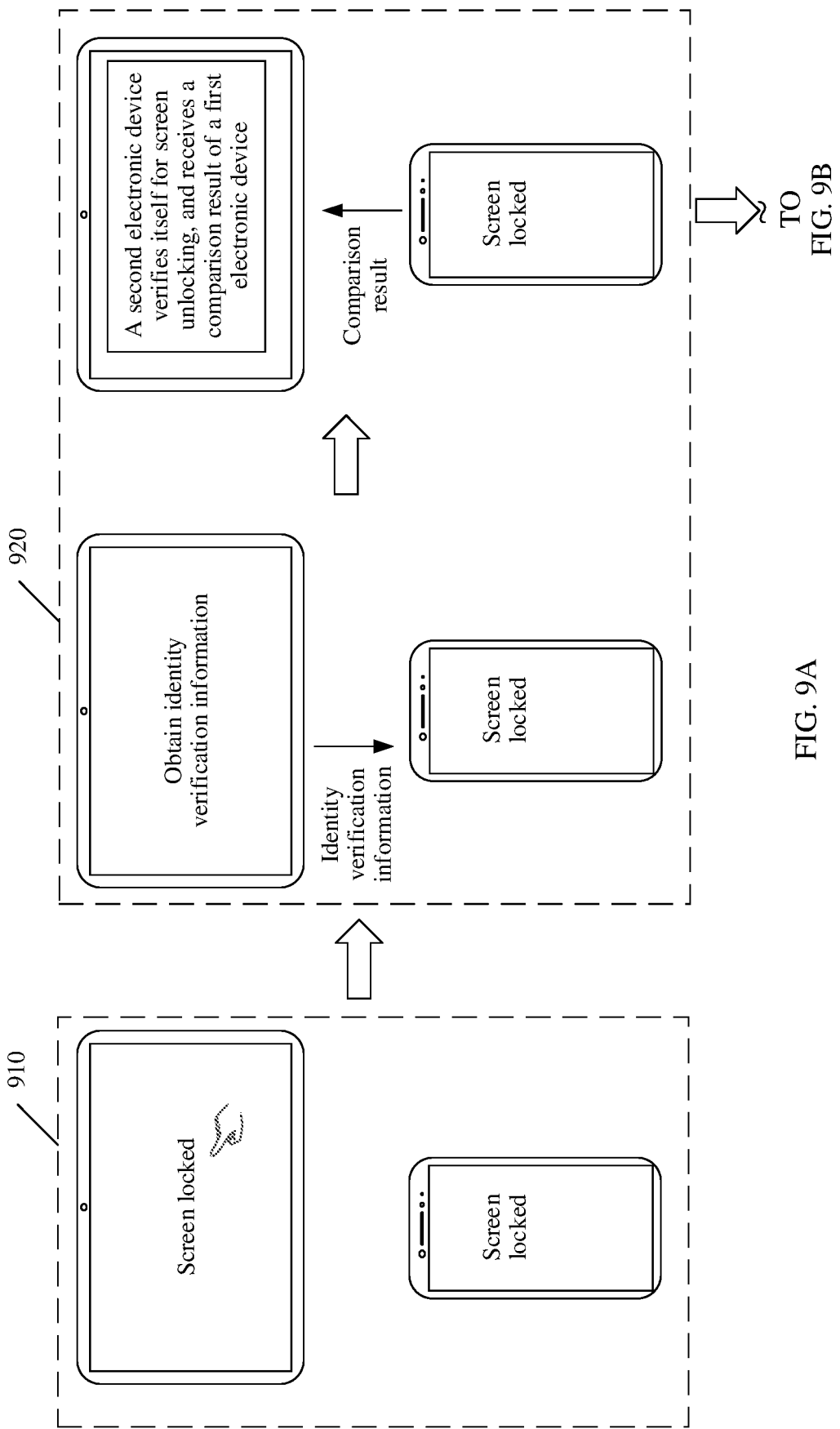
FIG. 9A and FIG. 9B are a flowchart of a still further embodiment of an identity verification method according to this application.
Figure 9B:
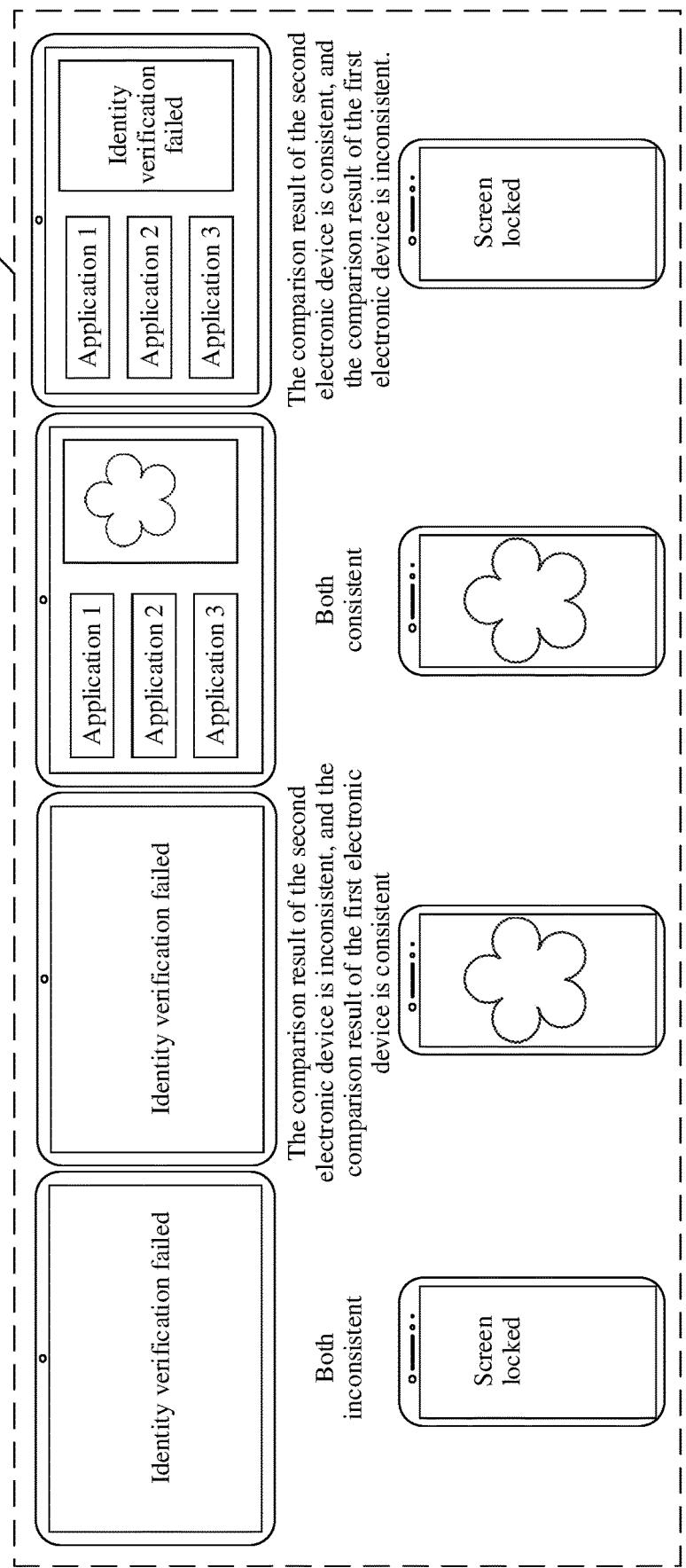

To facilitate a user operation, this application provides another identity verification method, as shown in FIG. 9A and FIG. 9B. Different from the embodiment shown in FIG. 8A to FIG. 8C in which the second electronic device and the first electronic device are unlocked in sequence, in the embodiment shown in FIG. 9A and FIG. 9B, a user only needs to perform an unlock operation on a second electronic device, that is, trigger the unlock operations of the second electronic device and a first electronic device. Specifically:

Refer to parts 910 to 930 in FIG. 9A and FIG. 9B. The second electronic device receives the unlock operation of the user; and in response to the unlock operation, the second electronic device collects identity verification information of the user; obtains a comparison result between the collected identity verification information and identity verification information pre-stored in the second electronic device; and obtains a comparison result between the collected identity verification information and identity verification information pre-stored in the first electronic device. If the collected identity verification information of the second electronic device is consistent with the identity verification information pre-stored in the first electronic device, display the screen projection interface; or if the comparison result is inconsistent, skip displaying the screen projection interface. If the identity verification information collected by the second electronic device is consistent with the identity verification information pre-stored in the second electronic device, unlock the second electronic device; or if the comparison result is inconsistent, skip unlocking the second electronic device.

It should be noted that, if the comparison result obtained by the second electronic device is consistent, and the comparison result obtained by the first electronic device is inconsistent, the screen projection interface of the first electronic device displayed on the second electronic device may be in a locked state, and a prompt indicating that identity verification of the first electronic device fails may be displayed. It should be noted that the second electronic device may collect one or more pieces of identity verification information, and the pieces of identity verification information may be of different types. For example, when the user enters an unlock password of the second electronic device, the second electronic device may collect a face image of the user, use the password entered by the user for identity verification of the second electronic device, and use the collected face image for identity verification of whether to display the screen projection interface of the first electronic device.

It should be noted that one-to-one screen projection is taken as an example for descriptions in FIG. 4A and FIG. 4B to FIG. 9A and FIG. 9B. It may be understood that the identity verification method provided in embodiments of this application may also be applicable to many-to-one screen projection.

Figure 10A:
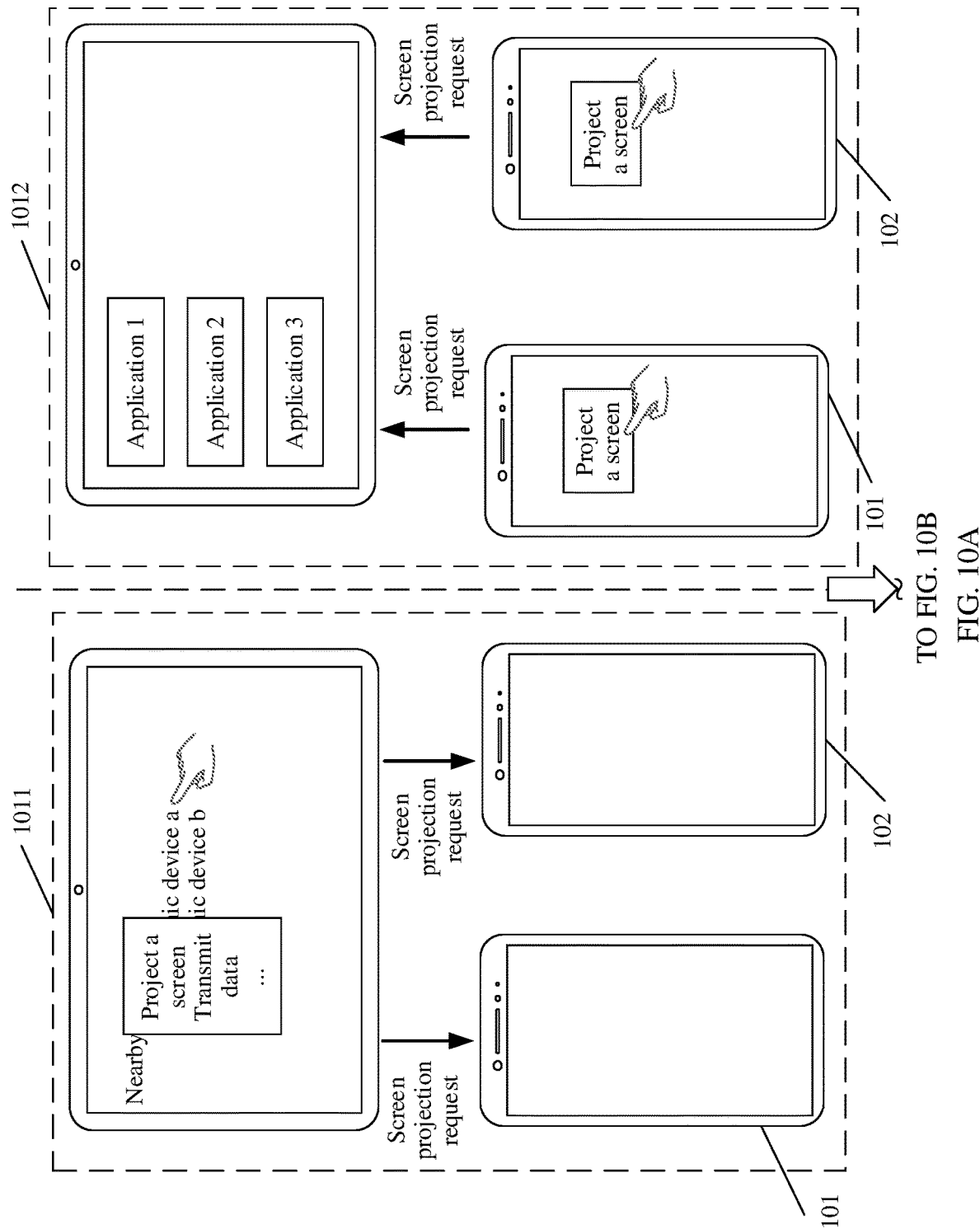
Figure 10C:
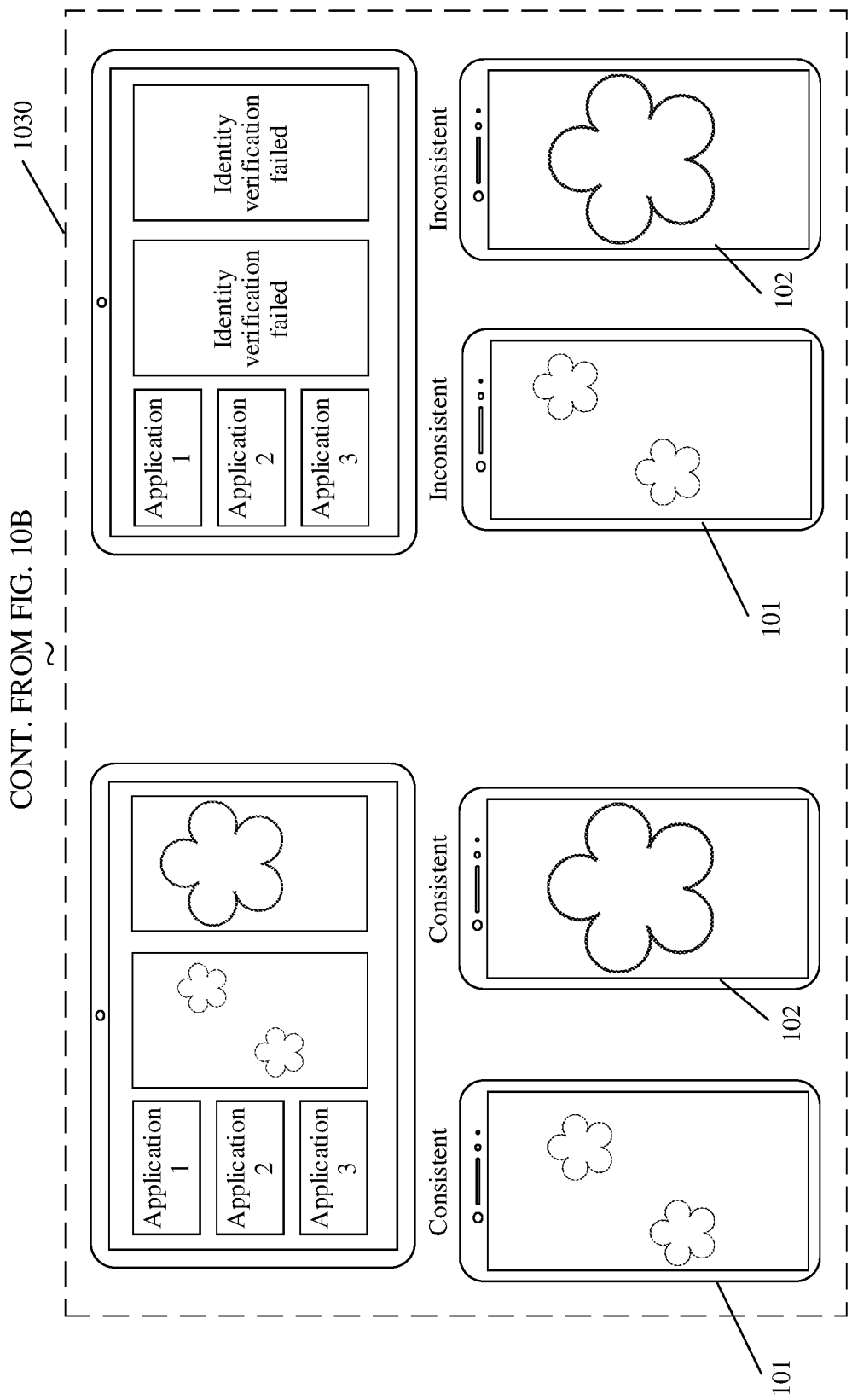

FIG. 10A to FIG. 10C are an example in which identity verification is triggered by receiving projection operations of two first electronic devices (an electronic device 101, and an electronic device 102) of projecting screens onto a second electronic device. Details are as follows:

Refer to part 1011 in FIG. 10A. The second electronic device receives a screen projection operation of a user, for example, the user selects two first electronic devices from a nearby device list provided by the second electronic device, and the second electronic device separately sends screen projection requests to the two first electronic devices selected by the user, and triggers identity verification of each first electronic device. Alternatively, refer to part 1012 in FIG. 10A. The second electronic device receives screen projection requests sent by a plurality of first electronic devices, and separately triggers identity verification of each first electronic device. For a specific identity verification process, refer to corresponding descriptions in FIG. 4A and FIG. 4B to FIG. 7. Details are not described herein again.

Figure 11A:
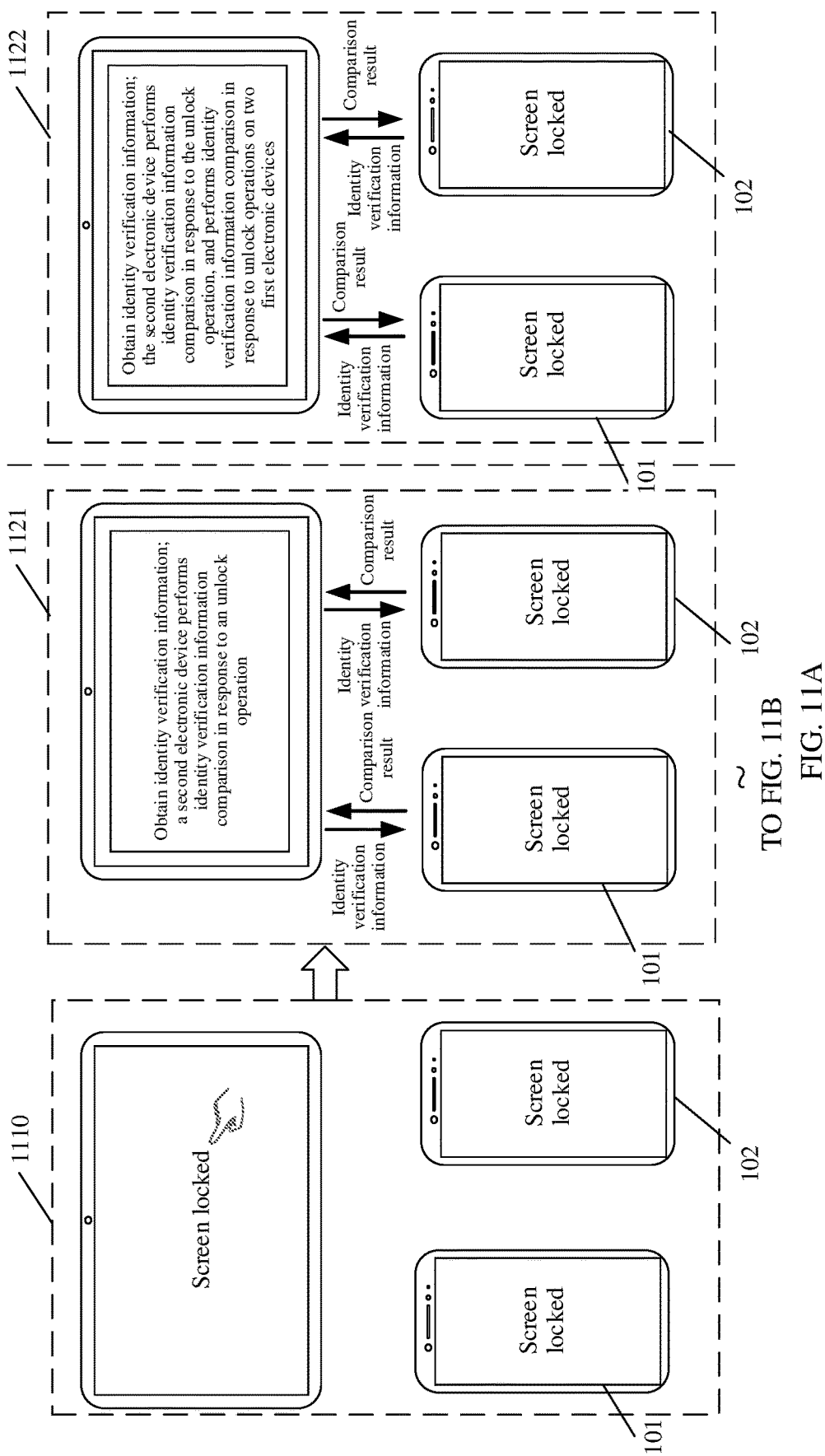
FIG. 11A and FIG. 11B are a flowchart of a still yet further embodiment of an identity verification method according to this application.
Figure 11B:
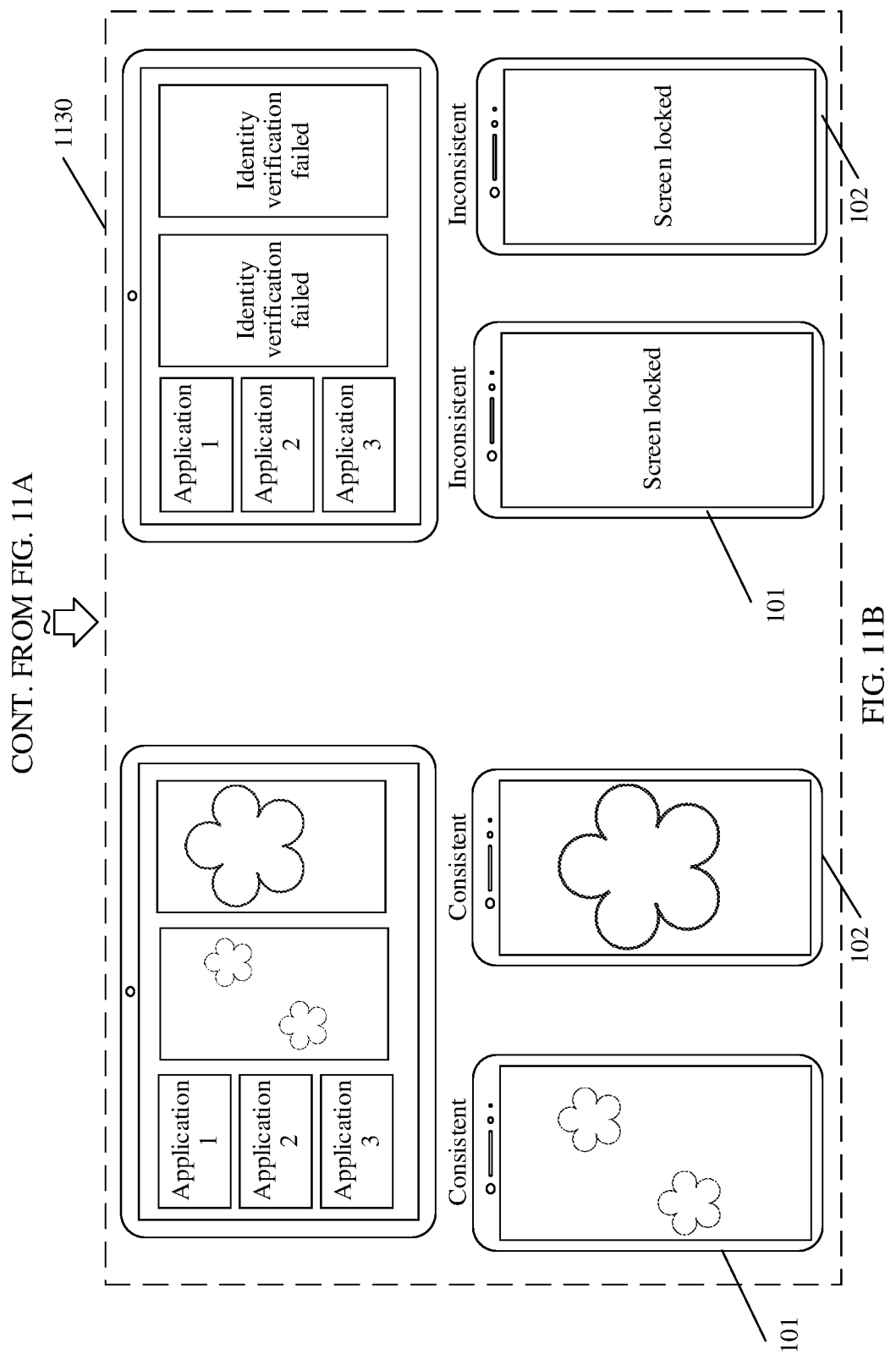

FIG. 11A and FIG. 11B are is an example in which screens of two first electronic devices (the electronic device 101, and the electronic device 102) are projected onto a second electronic device, both the two first electronic devices and the second electronic device are in a screen-locked state, and an unlock operation triggers identity verification. In response to the unlock operation performed by a user on the second electronic device, trigger identity verification for whether to display screen projection interfaces of the electronic device 101 and the electronic device 102. For a specific identity verification process, refer to corresponding descriptions in FIG. 9A and FIG. 9B. Details are not described herein again.

In embodiments of this application, a manner of connecting a first electronic device and a second electronic device may include but is not limited to the following two manners.

Figure 12:
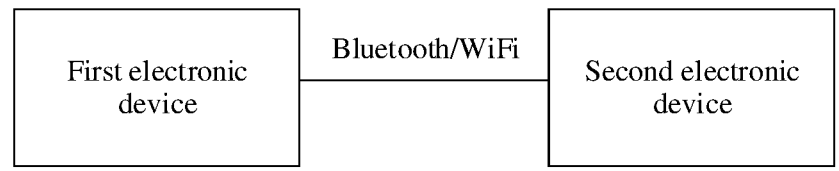
FIG. 12 is a schematic diagram of a direct connection between a first electronic device and a second electronic device according to an embodiment of this application.

Refer to FIG. 12. The first electronic device and the second electronic device may be directly connected, and may be connected in a wired manner or in a wireless manner during a direct connection. The wired manner includes but is not limited to a high-definition multimedia interface (High-Definition Multimedia Interface; HDMI for short) connection, and the wireless manner includes but is not limited to a Bluetooth or WiFi connection.

Figure 13:
FIG. 13 is a schematic diagram of an indirect connection between a first electronic device and a second electronic device according to an embodiment of this application.

Refer to FIG. 13. A first electronic device and a second electronic device may be indirectly connected via a cloud server. Specifically, the first electronic device and the second electronic device may be separately connected to the cloud server by using an account. Then, exchange data between the first electronic device and the second electronic device is forwarded based on the server.

Figure 14:
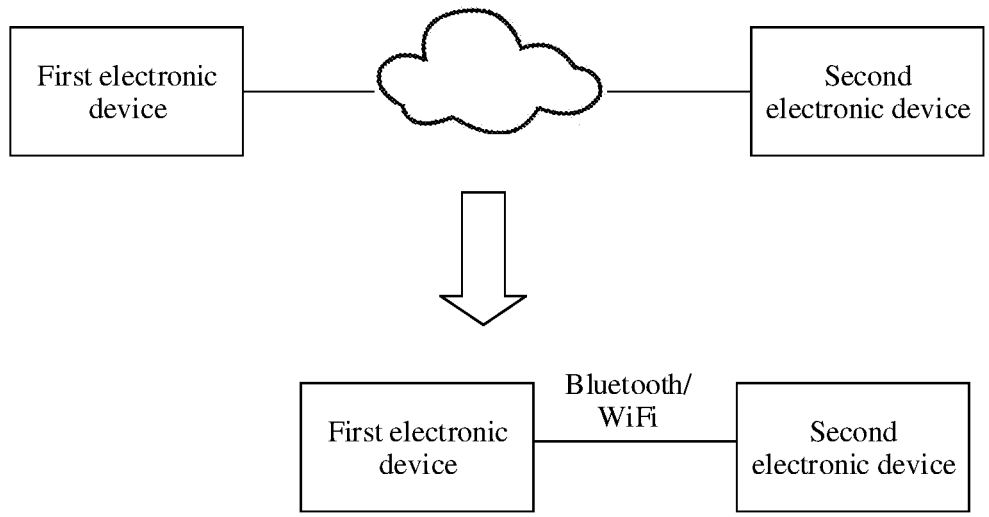
FIG. 14 is a schematic diagram of connection switching between a first electronic device and a second electronic device according to an embodiment of this application.

To ensure security of an identity verification information exchange between the first electronic device and the second electronic device in an identity verification process, when the identity verification information is transmitted between the first electronic device and the second electronic device, a direct connection may be used. Therefore, before the identity verification information is transmitted between the first electronic device and the second electronic device, whether the first electronic device and the second electronic device are directly connected may be determined. If the first electronic device and the second electronic device are not directly connected, the direct connection between the first electronic device and the second electronic device may be established, as shown in FIG. 14. When a direct connection between a second electronic device and a first electronic device is established, whether an indirect connection between the second electronic device and the first electronic device is disconnected is not limited in this embodiment of this application.

It may be understood that some or all of the steps or operations in the foregoing embodiments are merely examples. In embodiments of this application, other operations or variations of various operations may be further performed. In addition, the steps may be performed in a sequence different from that presented in the foregoing embodiments, and not all operations in the foregoing embodiments may need to be performed.

An embodiment of this application may provide an identity verification apparatus.

Figure 15:
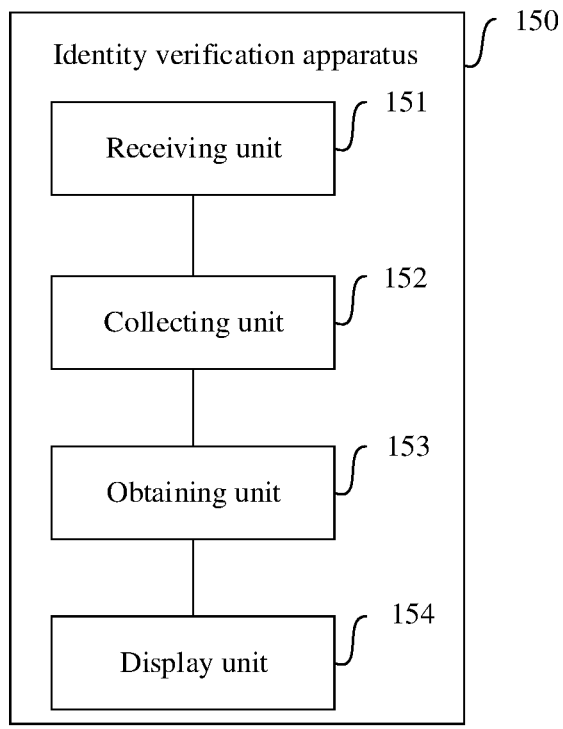
FIG. 15 is a schematic diagram of a structure of an embodiment of an identity verification apparatus according to this application.

FIG. 15 is a schematic diagram of a structure of an embodiment of the identity verification apparatus according to this application. As shown in FIG. 15, the apparatus 150 may include: a receiving unit 151, configured to receive a screen projection operation of projecting a screen of a first electronic device onto the apparatus by a user; a collecting unit 152, configured to collect identity verification information of the user in response to the screen projection operation; an obtaining unit 153, configured to obtain a comparison result between the collected identity verification information and identity verification information pre-stored in the first electronic device; and a display unit 154, configured to: if the comparison result is consistent, display, by the apparatus, a screen projection interface of the first electronic device; or if the comparison result is inconsistent, refuse to display the screen projection interface of the first electronic device.

Optionally, the obtaining unit 153 may be specifically configured to: send the collected identity verification information to the first electronic device; and receive the comparison result sent by the first electronic device between the collected identity verification information and the pre-stored identity verification information.

Optionally, the obtaining unit 153 may be specifically configured to: receive the identity verification information pre-stored in and sent by the first electronic device; and compare the collected identity verification information with the identity verification information pre-stored in the first electronic device.

Optionally, the obtaining unit 153 may be specifically configured to: send the collected identity verification information to a third electronic device; and receive the comparison result sent by the third electronic device between the collected identity verification information and the verification information pre-stored in the first electronic device.

Optionally, when the screen of the first electronic device is projected onto the second electronic device, the receiving unit 151 may be further configured to receive an unlock operation of the user; and the collecting unit 152 may be further configured to collect the identity verification information of the user in response to the unlock operation received by the receiving unit 152.

Optionally, the apparatus may further include: an unlock unit, configured to: if the comparison result between the collected identity verification information and the identity verification information pre-stored in the apparatus is consistent, unlock the apparatus; or if the comparison result is inconsistent, skip unlocking the apparatus.

Optionally, between the receiving unit 151 and the collecting unit 152, the following may be further included: an obtaining unit, configured to obtain a type of second identity verification information.

Optionally, between the receiving unit 151 and the collecting unit 152, the following may be further included: a distance determining unit, configured to determine that a distance between the apparatus and the first electronic device is less than a preset threshold.

Optionally, the apparatus may further include: a connection determining unit, configured to determine whether the apparatus is directly connected to the first electronic device; and a connection establishment unit, configured to: if the connection determining unit determines that the apparatus is not directly connected to the first electronic device, establish a direct connection between the apparatus and the first electronic device.

Figure 16:
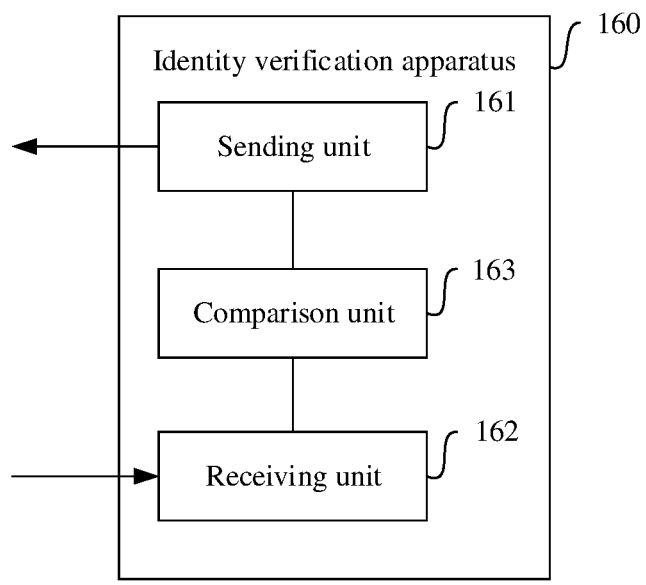
FIG. 16 is a schematic diagram of a structure of another embodiment of an identity verification apparatus according to this application.

FIG. 16 is a structural diagram of another embodiment of an identity verification apparatus according to this application. As shown in FIG. 16, the apparatus 160 may include: a receiving unit 162, configured to receive identity verification information sent by a second electronic device; and the identity verification information is identity verification information of a user collected by the second electronic device; a comparison unit 163, configured to compare the identity verification information collected by the second electronic device with identity verification information pre-stored in the apparatus, to obtain a comparison result; and a sending unit 161, configured to: if the comparison result is consistent, send interface data to the second electronic device.

Optionally, the receiving unit 151 may be further configured to receive a screen projection operation of the user; and the sending unit 161 may be further configured to send a screen projection request in response to the screen projection operation of the user.

Optionally, the apparatus 160 may further include: a connection determining unit, configured to determine whether the apparatus is directly connected to the second electronic device; and a connection establishment unit, configured to: if the connection determining unit determines that the apparatus is not directly connected to the second electronic device, establish a direct connection between the apparatus and the second electronic device.

The apparatuses provided in embodiments shown in FIG. 15 and FIG. 16 may be configured to perform the technical solutions in the method embodiments shown in FIG. 3 to FIG. 11A and FIG. 11B of this application. For implementation principles and technical effects of the apparatuses, refer to related descriptions in the foregoing embodiments. Details are not described herein again.

It should be understood that division into the units of the apparatuses shown in FIG. 15 and FIG. 16 is merely logical function division. In an actual implementation, all or some of the units may be integrated into one physical entity, or may be physically separated. In addition, all the units may be implemented in a form of software invoked by using a processing element; or may be implemented in a form of hardware; or some units may be implemented in the form of software invoked by using the processing element, and some units are implemented in the form of hardware. For example, the display unit may be an independently disposed processing element, or may be integrated into a chip of an electronic device for implementation. Implementations of the other units are similar thereto. In addition, all or some of the units may be integrated together, or may be implemented independently. In an implementation process, steps of the foregoing method or the foregoing units may be implemented by using a hardware integrated logical circuit in a processor element, or by using instructions in the form of software.

For example, the foregoing units may be one or more integrated circuits configured to implement the foregoing method, for example, one or more application-specific integrated circuits (Application-Specific Integrated Circuits; ASICs for short below), one or more digital signal processors (Digital Signal Processors; DSPs for short below), or one or more field programmable gate arrays (Field Programmable Gate Arrays; FPGAs for short below). For another example, these units may be integrated together, and implemented in a form of a system-on-a-chip (System-On-a-Chip; SOC for short below).

It should be noted that the electronic device in embodiments of this application includes but is not limited to a mobile phone, a computer, a PAD, a wearable device, an electronic large-screen display, a home device like a television or a refrigerator, an unmanned aerial vehicle, an automobile, and a vehicle-mounted device like a navigation device.

Figure 17:
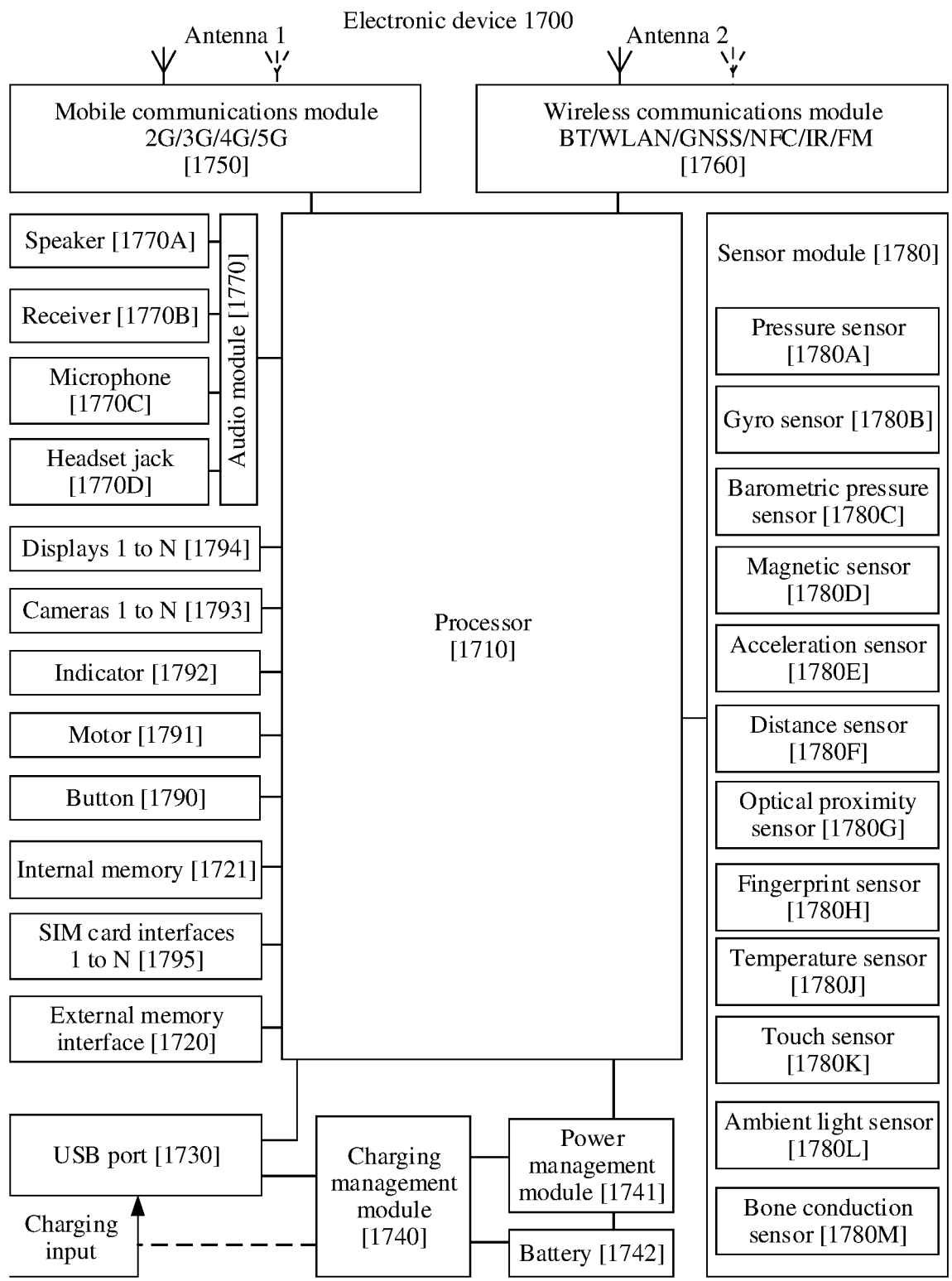
FIG. 17 is a schematic diagram of a structure of an embodiment of an electronic device according to this application.

For example, as shown in FIG. 17, an electronic device 1700 may include a processor 1710, an external memory interface 1720, an internal memory 1721, a universal serial bus (universal serial bus, USB) port 1730, a charging management module 1740, a power management module 1741, a battery 1742, an antenna 1, an antenna 2, a mobile communications module 1750, a wireless communications module 1760, an audio module 1770, a speaker 1770A, a receiver 1770B, a microphone 1770C, a headset jack 1770D, a sensor module 1780, a button 1790, a motor 1791, an indicator 1792, a camera 1793, a display 1794, a subscriber identification module (subscriber identification module, SIM) card interface 1795, and the like. The sensor module 1780 may include a pressure sensor 1780A, a gyro sensor 1780B, a barometric pressure sensor 1780C, a magnetic sensor 1780D, an acceleration sensor 1780E, a distance sensor 1780F, an optical proximity sensor 1780G, a fingerprint sensor 1780H, a temperature sensor 1780J, a touch sensor 1780K, an ambient light sensor 1780L, a bone conduction sensor 1780M, and the like.

It may be understood that a structure shown in this embodiment of the present invention does not constitute a specific limitation on the electronic device 1700. In some other embodiments of this application, the electronic device 1700 may include more or fewer components than those shown in the figure, or some components may be combined, some components may be split, or there may be a different component layout. The components shown in the figure may be implemented through hardware, software, or a combination of software and hardware.

The processor 1710 may include one or more processing units. For example, the processor 1710 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may generate an operation control signal based on an instruction operation code and a time sequence signal, to complete control of instruction fetching and instruction execution.

A memory may be further disposed in the processor 1710, and is configured to store instructions and data. In some embodiments, the memory in the processor 1710 is a cache. The memory may store instructions or data that has just been used or is cyclically used by the processor 1710. If the processor 1710 needs to use the instructions or the data again, the processor 1710 may directly invoke the instructions or the data from the memory. In this way, repeated access is avoided, waiting time of the processor 1710 is reduced, and system efficiency is improved.

In some embodiments, the processor 1710 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) port, and/or the like.

The I2C interface is a two-way synchronization serial bus, and includes one serial data line (serial data line, SDA) and one serial clock line (serial clock line, SCL). In some embodiments, the processor 1710 may include a plurality of groups of I2C buses. The processor 1710 may be separately coupled to the touch sensor 1780K, a charger, a flash, the camera 1793, and the like via different I2C bus interfaces. For example, the processor 1710 may be coupled to the touch sensor 1780K via the I2C interface, so that the processor 1710 communicates with the touch sensor 1780K via the I2C bus interface, to implement a touch function of the electronic device 1700.

The I2S interface may be used for audio communication. In some embodiments, the processor 1710 may include a plurality of groups of I2S buses. The processor 1710 may be coupled to the audio module 1770 through an I2S bus, to implement communication between the processor 1710 and the audio module 1770. In some embodiments, the audio module 1770 may transfer an audio signal to the wireless communications module 1760 via the I2S interface, to implement a function of answering a call by using a Bluetooth headset.

The PCM interface may also be used for the audio communication, to sample, quantize, and encode an analog signal. In some embodiments, the audio module 1770 may be coupled to the wireless communications module 1760 via the PCM bus interface. In some embodiments, the audio module 1770 may alternatively transfer the audio signal to the wireless communications module 1760 via the PCM interface, to implement the function of answering the call by using the Bluetooth headset. Both the I2S interface and the PCM interface may be used for the audio communication.

The UART interface is a universal serial data bus, and is used for asynchronous communication. The bus may be a two-way communications bus. The bus converts to-be-transmitted data between serial communication and parallel communication. In some embodiments, the UART interface is usually used to connect the processor 1710 to the wireless communications module 1760. For example, the processor 1710 communicates with a Bluetooth module in the wireless communications module 1760 via the UART interface, to implement a Bluetooth function. In some embodiments, the audio module 1770 may transfer the audio signal to the wireless communications module 1760 via the UART interface, to implement a function of playing music by using the Bluetooth headset.

The MIPI interface may further be configured to connect the processor 1710 to a peripheral device such as the display 1794 or the camera 1793. The MIPI interface includes a camera serial interface (camera serial interface, CSI), a display serial interface (display serial interface, DSI), and the like. In some embodiments, the processor 1710 communicates with the camera 1793 via the CSI, to implement a photographing function of the electronic device 1700. The processor 1710 communicates with the display 1794 via the DSI, to implement a display function of the electronic device 1700.

The GPIO interface may be configured by using software. The GPIO interface may be configured as a control signal, or may be configured as a data signal. In some embodiments, the GPIO interface may be configured to connect the processor 1710 to the camera 1793, the display 1794, the wireless communications module 1760, the audio module 1770, the sensor module 1780, or the like. The GPIO interface may alternatively be configured as the I2C interface, the I2S interface, the UART interface, the MIPI interface, or the like.

The USB port 1730 is a port that conforms to a USB standard specification, and may be specifically a mini USB port, a micro USB port, a USB Type-C port, or the like. The USB port 1730 may be configured to connect to the charger to charge the electronic device 1700, may be configured to perform data transmission between the electronic device 1700 and a peripheral device, or may be configured to connect to a headset, to play audio through the headset. This port may be further configured to connect to another electronic device such as an AR device.

It may be understood that an interface connection relationship between the modules that is shown in this embodiment of the present invention is merely an example for description, and does not constitute a limitation on the structure of the electronic device 1700. In some other embodiments of this application, the electronic device 1700 may alternatively use an interface connection manner different from that in the foregoing embodiment, or a combination of a plurality of interface connection manners.

The charging management module 1740 is configured to receive a charging input from the charger. The charger may be a wireless charger, or may be a wired charger. In some embodiments of wired charging, the charging management module 1740 may receive the charging input from the wired charger via the USB port 1730. In some embodiments of wireless charging, the charging management module 1740 may receive a wireless charging input via a wireless charging coil of the electronic device 1700. The charging management module 1740 may further supply power to the electronic device by using the power management module 1741 while charging the battery 1742.

The power management module 1741 is configured to connect to the battery 1742, the charging management module 1740, and the processor 1710. The power management module 1741 receives an input from the battery 1742 and/or the charging management module 1740, and supplies power to the processor 1710, the internal memory 1721, the display 1794, the camera 1793, the wireless communications module 1760, and the like. The power management module 1741 may be further configured to monitor parameters such as a battery capacity, a battery cycle count, and a battery health status (electricity leakage or impedance). In some other embodiments, the power management module 1741 may alternatively be disposed in the processor 1710. In some other embodiments, the power management module 1741 and the charging management module 1740 may alternatively be disposed in a same device.

A wireless communication function of the electronic device 1700 may be implemented by the antenna 1, the antenna 2, the mobile communications module 1750, the wireless communications module 1760, the modem processor, the baseband processor, and the like.

The antenna 1 and the antenna 2 are configured to transmit and receive an electromagnetic wave signal. Each antenna in the electronic device 1700 may be configured to cover one or more communications frequency bands. Different antennas may be further multiplexed, to improve antenna utilization. For example, the antenna 1 may be multiplexed as a diversity antenna of a wireless local area network. In some other embodiments, the antennas may be used in combination with a tuning switch.

The mobile communications module 1750 may provide a solution that is applied to the electronic device 1700 and that includes wireless communication such as 2G, 3G, 4G, and 5G. The mobile communications module 1750 may include at least a filter, a switch, a power amplifier, a low noise amplifier (low noise amplifier, LNA), and the like. The mobile communications module 1750 may receive an electromagnetic wave by using the antenna 1, perform processing such as filtering and amplification on the received electromagnetic wave, and transmit a processed electromagnetic wave to the modem processor for demodulation. The mobile communications module 1750 may further amplify a signal modulated by the modem processor, and convert the signal into an electromagnetic wave for radiation by using the antenna 1. In some embodiments, at least some functional modules of the mobile communications module 1750 may be disposed in the processor 1710. In some embodiments, at least some functional modules of the mobile communications module 1750 and at least some modules of the processor 1710 may be disposed in a same device.

The modem processor may include a modulator and a demodulator. The modulator is configured to modulate a to-be-sent low-frequency baseband signal into a medium-high frequency signal. The demodulator is configured to demodulate the received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal via an audio device (which is not limited to the speaker 1770A, the receiver 1770B, and the like), or displays an image or a video via the display 1794. In some embodiments, the modem processor may be an independent device. In some other embodiments, the modem processor may be independent of the processor 1710, and is disposed in a same device with the mobile communications module 1750 or another functional module.

The wireless communications module 1760 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like and that is applied to the electronic device 1700. The wireless communications module 1760 may be one or more devices integrating at least one communications processor module. The wireless communications module 1760 receives an electromagnetic wave by using the antenna 2, performs frequency modulation and filtering on the electromagnetic wave signal, and sends a processed signal to the processor 1710. The wireless communications module 1760 may further receive a to-be-sent signal from the processor 1710, perform frequency modulation and amplification on the signal, and convert the signal into an electromagnetic wave for radiation by using the antenna 2.

In some embodiments, the antenna 1 of the electronic device 1700 is coupled to the mobile communications module 1750, and the antenna 2 is coupled to the wireless communications module 1760. In this case, the electronic device 1700 may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 1700 implements the display function by using the GPU, the display 1794, the application processor, and the like. The GPU is a microprocessor for image processing, and is connected to the display 1794 and the application processor. The GPU is configured to perform mathematical and geometric calculation, and render an image. The processor 1710 may include one or more GPUs that execute program instructions to generate or change display information.

The display 1794 is configured to display an image, a video, and the like. The display 1794 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like.

In some embodiments, the electronic device 1700 may include one or N displays 1794, where N is a positive integer greater than 1.

The electronic device 1700 may implement the photographing function by using the ISP, the camera 1793, the video codec, the GPU, the display 1794, the application processor, and the like.

The ISP is configured to process data fed back by the camera 1793. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 1793.

The camera 1793 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts the optical signal into the electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 1700 may include one or N cameras 1793, where N is a positive integer greater than 1.

The digital signal processor is configured to process a digital signal, and may process another digital signal in addition to processing the digital image signal. For example, when the electronic device 1700 selects a frequency, the digital signal processor is configured to perform Fourier Transform on frequency energy, and the like.

The video codec is configured to: compress or decompress a digital video. The electronic device 1700 may support one or more types of video codecs. In this way, the electronic device 1700 may play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform auto-learning. The NPU can implement applications such as intelligent cognition of the electronic device 1700, for example, image recognition, facial recognition, speech recognition, and text understanding.

The external memory interface 1720 may be configured to connect to an external memory card, for example, a Micro SD card, to extend a storage capability of the electronic device 1700. The external storage card communicates with the processor 1710 through the external memory interface 1720, to implement a data storage function. For example, files such as music and a video are stored in the external storage card.

The internal memory 1721 may be configured to store computer-executable program code. The executable program code includes instructions. The internal memory 1721 may include a program storage area and a data storage area. The program storage area may store an operating system, an application required by at least one function (for example, a sound play function or an image play function), and the like. The data storage area may store data (such as audio data and an address book) and the like that are created during use of the electronic device 1700. In addition, the internal memory 1721 may include a high speed random access memory, and may further include a nonvolatile memory, such as at least one magnetic disk storage device, a flash memory device, a universal flash storage (universal flash storage, UFS), or the like. The processor 1710 runs the instructions stored in the internal memory 1721, and/or the instructions stored in the memory disposed in the processor, to perform various function applications of the electronic device 1700 and data processing.

The electronic device 1700 may implement an audio function by using the audio module 1770, the speaker 1770A, the receiver 1770B, the microphone 1770C, the headset jack 1770D, the application processor, and the like, for example, music playing or recording.

The audio module 1770 is configured to convert digital audio information into an analog audio signal for output, and is also configured to convert an analog audio input into a digital audio signal. The audio module 1770 may further be configured to: code and decode the audio signal. In some embodiments, the audio module 1770 may be disposed in the processor 1710, or some functional modules of the audio module 1770 are disposed in the processor 1710.

The speaker 1770A, also referred to as a "horn", is configured to convert an audio electrical signal into a sound signal. The electronic device 1700 may be used to listen to music or answer a call in a hands-free mode over the speaker 1770A.

The receiver 1770B, also referred to as an "earpiece", is configured to convert an audio electrical signal into a sound signal. When a call is answered or voice information is received by using the electronic device 1700, the receiver 1770B may be put close to a human ear to listen to a voice.

The microphone 1770C, also referred to as a "mike" or a "mic", is configured to convert a sound signal into an electrical signal. When making a call or sending voice information, a user may make a sound near the microphone 1770C through the mouth of the user, to input the sound signal to the microphone 1770C. At least one microphone 1770C may be disposed in the electronic device 1700. In some other embodiments, two microphones 1770C may be disposed in the electronic device 1700, to collect the sound signal and further implement a noise reduction function. In some other embodiments, three, four, or more microphones 1770C may alternatively be disposed in the electronic device 1700, to collect the sound signal, implement noise reduction, and identify a sound source, implement a directional recording function and the like.

The headset jack 1770D is configured to connect to a wired headset. The headset jack 1770D may be the USB port 1730, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 1780A is configured to sense a pressure signal, and may convert the pressure signal into an electrical signal. In some embodiments, the pressure sensor 1780A may be disposed in the display 1794. There are many types of pressure sensors 1780A, such as a resistive pressure sensor, an inductive pressure sensor, and a capacitive pressure sensor. The capacitive pressure sensor may include at least two parallel plates made of conductive materials. When a force is applied to the pressure sensor 1780A, capacitance between electrodes changes. The electronic device 1700 determines pressure intensity based on a capacitance change. When a touch operation is performed on the display 1794, the electronic device 1700 detects strength of the touch operation based on the pressure sensor 1780A. The electronic device 1700 may calculate a touch location based on a detection signal of the pressure sensor 1780A. In some embodiments, touch operations that are performed at a same touch location but have different touch operation strength may correspond to different operation instructions. For example, when a touch operation whose touch operation strength is less than a first pressure threshold is performed on an SME message application icon, an instruction for viewing an SMS message is performed. When a touch operation whose touch operation strength is greater than or equal to the first pressure threshold is performed on the SME message application icon, an instruction for creating a new SMS message is performed.

The gyro sensor 1780B may be configured to determine a motion posture of the electronic device 1700. In some embodiments, an angular velocity of the electronic device 100 around three axes (namely, axes x, y, and z) may be determined by using the gyro sensor 1780B. The gyro sensor 1780B may be configured to implement image stabilization during photographing. For example, when the shutter is pressed, the gyro sensor 1780B detects an angle at which the electronic device 1700 jitters, calculates, based on the angle, a distance for which a lens module needs to compensate, and allows the lens to cancel the jitter of the electronic device 1700 by using a reverse motion, to implement the image stabilization. The gyro sensor 1780B may be used in a navigation scenario and a motion-sensing game scenario.

The barometric pressure sensor 1780C is configured to measure barometric pressure. In some embodiments, the electronic device 1700 calculates an altitude based on a barometric pressure value measured by the barometric pressure sensor 1780C, to assist in positioning and navigation.

The magnetic sensor 1780D includes a Hall effect sensor. The electronic device 1700 may detect opening and closing of a flip cover by using the magnetic sensor 1780D. In some embodiments, when the electronic device 1700 is a flip phone, the electronic device 1700 may detect opening and closing of a flip by using the magnetic sensor 1780D. Further, a feature such as automatic unlock upon opening of the flip cover is set based on a detected opening and closing state of the flip cover.

The acceleration sensor 1780E may detect magnitudes of acceleration in various directions (usually on three axes) of the electronic device 1700, and may detect a magnitude and a direction of gravity when the electronic device 1700 is still. The acceleration sensor 1780E may be further configured to identify a posture of the electronic device, and is used in an application such as switching between a landscape mode and a portrait mode or a pedometer.

The distance sensor 1780F is configured to measure a distance. The electronic device 1700 may measure the distance in an infrared or a laser manner. In some embodiments, in a photographing scenario, the electronic device 1700 may measure the distance by using the distance sensor 1780F to implement quick focusing.

The optical proximity sensor 1780G may include a light-emitting diode (LED) and an optical detector, for example, a photodiode. The light-emitting diode may be an infrared light-emitting diode. The electronic device 1700 emits infrared light by using the light-emitting diode. The electronic device 1700 detects infrared reflected light from a nearby object by using the photodiode. When sufficient reflected light is detected, the electronic device 1700 may determine that there is an object near the electronic device 1700. When insufficient reflected light is detected, the electronic device 1700 may determine that there is no object near the electronic device 1700. The electronic device 1700 may detect, by using the optical proximity sensor 1780G, that the user holds the electronic device 1700 close to an ear for a call, to automatically turn off a screen for power saving. The optical proximity sensor 1780G may also be configured to automatically unlock and lock a screen in a flip cover mode and a pocket mode.

The ambient light sensor 1780L is configured to sense ambient light brightness. The electronic device 1700 may adaptively adjust brightness of the display 1794 based on the sensed ambient light brightness. The ambient light sensor 1780L may also be configured to automatically adjust a white balance during photographing. The ambient light sensor 1780L may further cooperate with the optical proximity sensor 1780G, to detect whether the electronic device 1700 is in a pocket, to prevent an accidental touch.

The fingerprint sensor 1780H is configured to collect a fingerprint. The electronic device 1700 may implement fingerprint-based unlocking, access to an application lock, fingerprint-based photographing, fingerprint-based call answering, and the like by using a feature of a collected fingerprint.

The temperature sensor 1780J is configured to detect a temperature. In some embodiments, the electronic device 1700 executes a temperature processing policy based on the temperature detected by the temperature sensor 1780J. For example, when the temperature reported by the temperature sensor 1780J exceeds a threshold, the electronic device 1700 lowers performance of a processor near the temperature sensor 1780J, to reduce power consumption and implement thermal protection. In some other embodiments, when the temperature is less than another threshold, the electronic device 1700 heats the battery 1742 to prevent the electronic device 1700 from being shut down abnormally due to a low temperature. In some other embodiments, when the temperature is less than still another threshold, the electronic device 1700 boosts an output voltage of the battery 1742 to avoid an abnormal shutdown due to the low temperature.

The touch sensor 1780K is also referred to as a "touch device". The touch sensor 1780K may be disposed in the display 1794. The touch sensor 1780K and the display 1794 constitute a touchscreen which is also referred to as a "touchscreen". The touch sensor 1780K is configured to detect the touch operation performed on or near the touch sensor. The touch sensor may transfer a detected touch operation to the application processor, to determine a type of a touch event. The display 1794 may provide a visual output related to the touch operation. In some other embodiments, the touch sensor 1780K may alternatively be disposed on a surface of the electronic device 1700, and a location of the touch sensor 1780K is different from a location of the display 1794.

The bone conduction sensor 1780M may obtain a vibration signal. In some embodiments, the bone conduction sensor 1780M may obtain the vibration signal of a vibration bone of a human vocal-cord part. The bone conduction sensor 1780M may also be in contact with a human pulse, to receive a blood pressure beating signal. In some embodiments, the bone conduction sensor 1780M may alternatively be disposed in the headset to form a bone conduction headset. The audio module 1770 may parse out a voice signal based on the vibration signal that is of the vibration bone of the vocal-cord part and that is obtained by the bone conduction sensor 1780M, to implement a voice function. The application processor may parse heart rate information based on the blood pressure beating signal obtained by the bone conduction sensor 1780M, to implement a heart rate detection function.

The button 1790 includes a power button, a volume button, or the like. The button 1790 may be a mechanical button, or may be a touch button. The electronic device 1700 may receive a key input, and generate a key signal input related to a user setting and function control of the electronic device 1700.

The motor 1791 may generate a vibration prompt. The motor 1791 may be used for an incoming call vibration prompt, or may be used for a touch vibration feedback. For example, touch operations performed on different applications (such as a photographing application and audio play) may correspond to different vibration feedback effects. The motor 1791 may also correspond to the different vibration feedback effects for touch operations performed on different areas of the display 1794. Different application scenarios (for example, time reminder, information receiving, an alarm clock, and a game) may also correspond to the different vibration feedback effects. A touch vibration feedback effect may further be customized.

The indicator 1792 may be an indicator lamp, and may be configured to indicate a charging status and a power change, or may be configured to indicate a message, a missed call, a notification, and the like.

The SIM card interface 1795 is configured to connect a SIM card. The SIM card may be inserted into the SIM card interface 1795 or removed from the SIM card interface 1795, to implement contact with or separation from the electronic device 1700. The electronic device 1700 may support one or N SIM card interfaces, where N is a positive integer greater than 1. The SIM card interface 1795 can support a nano-SIM card, a micro-SIM card, a SIM card, and the like. A plurality of cards may be inserted into a same SIM card interface 1795 at the same time. The plurality of cards may be of a same type or of different types. The SIM card interface 1795 may also be compatible with different types of SIM cards. The SIM card interface 1795 may also be compatible with an external storage card. The electronic device 1700 interacts with a network via the SIM card, to implement functions such as calling and data communication. In some embodiments, the electronic device 1700 uses an eSIM, that is, an embedded SIM card. The eSIM card may be embedded in the electronic device 1700, and cannot be separated from the electronic device 1700.

It should be understood that the electronic device 1700 shown in FIG. 17 can implement processes of the method provided in embodiments shown in FIG. 3 to FIG. 14 of this application. Operations and/or functions of the modules in the electronic device 1700 are separately intended to implement corresponding processes in the foregoing method embodiments. For details, refer to the descriptions in the method embodiments shown in FIG. 3 to FIG. 14. To avoid repetition, detailed descriptions are properly omitted herein.

It should be understood that the processor 1710 in the electronic device 1700 shown in FIG. 17 may be a system-on-a-chip SOC. The processor 1710 may include a central processing unit (Central Processing Unit, CPU), or may further include another type of processor, for example, a graphics processing unit (Graphics Processing Unit, GPU).

In conclusion, some processors or processing units in the processor 1710 may work together to implement the foregoing method processes, and software programs corresponding to the processors or processing units may be stored in the internal memory 121.

Figure 18:
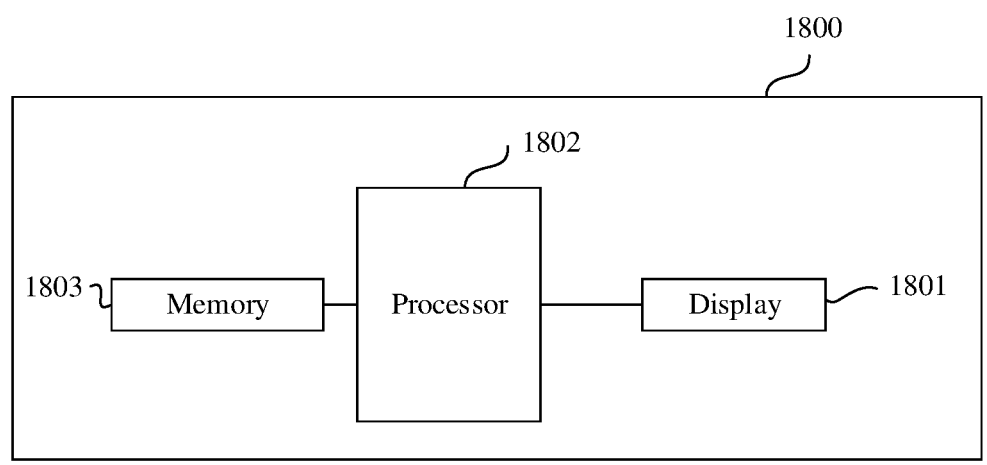
FIG. 18 is a schematic diagram of a structure of another embodiment of an electronic device according to the application.

FIG. 18 is a schematic diagram of a structure of another electronic device according to this application. As shown in FIG. 18, an electronic device 1800 may include a display 1801, one or more processors 1802, a memory 1803, and one or more computer programs.

The one or more computer programs are stored in the memory 1803, the one or more computer programs include instructions, and when the instructions are executed by the device 1800, the device 1800 is enabled to perform the identity verification method shown in FIG. 3 to FIG. 14 in embodiments of this application. For details, refer to the specific descriptions of the foregoing embodiments. The details are not described herein again. The processor 1802 may be the processor 1710 shown in FIG. 17, the display 1801 may be the display 1794 shown in FIG. 17, and the memory 1803 may be the internal memory 1721 shown in FIG. 17.

This application further provides an electronic device. The device includes a storage medium and a central processing unit. The storage medium may be a nonvolatile storage medium, and the storage medium stores a computer executable program. The central processing unit is connected to the nonvolatile storage medium, and executes the computer executable program to implement the method provided in the embodiments shown in FIG. 3 to FIG. 14 of this application.

In the foregoing embodiments, the processor may include, for example, a CPU, a DSP, a microcontroller, or a digital signal processor, and may further include a GPU, an embedded neural-network process unit (Neural-network Process Unit, NPU for short), and an image signal processor (Image Signal Processor, ISP for short). The processor may further include a necessary hardware accelerator or a logic processing hardware circuit, for example, an ASIC, or one or more integrated circuits configured to control program execution of the technical solutions in this application. In addition, the processor may have a function of operating one or more software programs. The software program may be stored in the storage medium.

An embodiment of this application further provides a computer-readable storage medium. The computer-readable storage medium stores a computer program. When the computer program is run on a computer, the computer is enabled to perform the method provided in the embodiments shown in FIG. 3 to FIG. 14 in this application.

An embodiment of this application further provides a computer program product. The computer program product includes a computer program. When the computer program is run on a computer, the computer is enabled to perform the method provided in the embodiments shown in FIG. 3 to FIG. 14 in this application.

In embodiments of this application, "at least one" means one or more, and "a plurality of" means two or more. The term "and/or" describes an association relationship between associated objects and indicates that three relationships may exist. For example, A and/or B may indicate the following three cases: Only A exists, both A and B exist, and only B exists. A and B may be in a singular form or a plural form. The character "/" generally indicates an "or" relationship between the associated objects. At least one of the following items and a similar expression refer to any combination of the items, including a single item or any combination of plural items. For example, at least one of a, b, and c may indicate a, b, c, a and b, a and c, b and c, or a, b, and c, where a, b, and c may be singular or plural.

A person of ordinary skill in the art may be aware that units and algorithm steps described in embodiments disclosed in this specification may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the embodiments of this application, when any of the functions are implemented in a form of a software functional unit and sold or used as an independent product, the functions may be stored in a computer-readable storage medium. Based on this understanding, the technical solutions of this application essentially, or the part contributing to the conventional technology, or some of the technical solutions may be implemented in a form of a software product. The computer software product is stored in a storage medium, and includes several instructions for instructing a computer device (which may be, for example, a personal computer, a server, or a network device) to perform all or some of the steps of the methods described in embodiments of this application. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or a compact disc.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. An identity verification method, comprising:
   receiving a screen projection operation performed by a user to project a screen of a first electronic device onto a second electronic device;
   obtaining, by the second electronic device, a type of a second identity verification information pre-stored in the first electronic device;
   collecting, by the second electronic device based on the type of the second identity verification information, first identity verification information of the user in response to the screen projection operation;
   obtaining a first comparison result between the first identity verification information and the second identity verification information pre-stored in the first electronic device; and
   displaying, by the second electronic device, based on the first comparison result indicating that the first identity verification information matches the second identity verification information, a screen projection interface of the first electronic device, wherein the screen projection interface is in a locked state;

receiving, by the second electronic device, an unlock operation performed by the user;

collecting, by the second electronic device following receiving the unlock operation performed by the user, third identity verification information of the user;

obtaining a second comparison result between the third identity verification information and the second identity verification information; and performing at least one of:
 displaying, by the second electronic device, based on the second comparison result indicating that the third identity verification information matches the second identity verification information, the screen projection interface of the first electronic device in an unlocked state; or
 skipping displaying, by the second electronic device, based on the second comparison result indicating that the third identity verification information does not match the second identity verification information, the screen projection interface of the first electronic device.

2. The method according to claim 1, wherein the obtaining the first comparison result between the first identity verification information and the second identity verification information comprises:

sending, by the second electronic device, the first identity verification information to the first electronic device; and receiving, by the second electronic device, the first comparison result between the first identity verification information sent by the first electronic device and the second identity verification information.

3. The method according to claim 1, wherein the obtaining the first comparison result between the first identity verification information and the second identity verification information comprises:

receiving, by the second electronic device, the second identity verification information sent by the first electronic device; and comparing, by the second electronic device, the first identity verification information with the second identity verification information.

4. The method according to claim 1, wherein the obtaining the first comparison result between the first identity verification information and the second identity verification information comprises:

sending, by the second electronic device, the first identity verification information to a third electronic device; and receiving, by the second electronic device, the first comparison result between the first identity verification information and the second identity verification information sent by the third electronic device.

5. The method according to claim 1, wherein the method further comprises:

collecting, by the second electronic device, fourth identity verification information of the user in response to the unlock operation;

comparing, by the second electronic device, the fourth identity verification information with fifth identity verification information pre-stored in the second electronic device to obtain a third comparison result; and performing at least one of:
 unlocking, based on the third comparison result indicating that the fourth identity verification information matches the fifth identity verification information, the second electronic device; or
 skipping unlocking, based on the third comparison result indicating that the fourth identity verification information does not match the fifth identity verification information, the second electronic device.

6. The method according to claim 1, wherein the method further comprises:

comparing, by the second electronic device, the third identity verification information with fifth identity verification information pre-stored in the second electronic device in response to the unlock operation, to obtain a fourth comparison result; and performing at least one of:
 unlocking, based on the fourth comparison result indicating that the third identity verification information matches the fifth identity verification information, the second electronic device; or
 skipping unlocking, based on the fourth comparison result indicating that the third identity verification information does not match the fifth identity verification information, the second electronic device.

7. The method according to claim 1, wherein after receiving the screen projection operation, and before collecting the first identity verification information, the method further comprises:

obtaining, by the second electronic device, a distance between the second electronic device and the first electronic device; and determining, by the second electronic device, that the distance between the second electronic device and the first electronic device is less than a preset threshold.

8. The method according to claim 1, further comprising:

determining, by the second electronic device, whether the second electronic device is directly connected to the first electronic device; and establishing, by the second electronic device, based on the second electronic device not being directly connected to the first electronic device, a direct connection between the second electronic device and the first electronic device.

9. A second electronic device, comprising:
a display;
one or more processors; and
a non-transitory computer-readable storage medium storing a program to be executed by the one or more processors, the program including instructions for:

receiving a screen projection operation performed by a user to project a screen of a first electronic device onto the second electronic device;

obtaining a type of a second identity verification information pre-stored in the first electronic device;

collecting, based on the type of the second identity verification information, first identity verification information of the user in response to the screen projection operation;

obtaining a first comparison result between the first identity verification information and the second identity verification information pre-stored in the first electronic device; and displaying, based on the first comparison result indicating that the first identity verification information matches the second identity verification information, a screen projection interface of the first electronic device, wherein the screen projection interface is in a locked state;

receiving an unlock operation performed by the user;

collecting third identity verification information of the user;

obtaining a second comparison result between the third identity verification information and the second identity verification information; and performing at least one of:
 displaying, based on the second comparison result indicating that the third identity verification information matches the second identity verification information, the screen projection interface of the first electronic device in an unlocked state; or
 skipping displaying, based on the second comparison result indicating that the third identity verification information does not match the second identity verification information, the screen projection interface of the first electronic device.

10. An identity verification method, comprising:
 receiving, by a first electronic device, a screen projection operation of a user;
 sending, by the first electronic device, a screen projection request to a second electronic device;
 sending, by the first electronic device, a type of a second identity verification information pre-stored in the first electronic device;
 receiving, by the first electronic device, first identity verification information sent by the second electronic device, the first identity verification information of a type that is identical to the type of the second identity verification information, wherein the first identity verification information is collected by the second electronic device in response to the screen projection request;
 comparing, by the first electronic device, the first identity verification information with the second identity verification information pre-stored in the first electronic device, to obtain a first comparison result; and
 sending, by the first electronic device, based on the first comparison result indicating that the first identity verification information matches the second identity verification information, interface data to the second electronic device.

11. The method according to claim 10, further comprising:
 receiving, by the first electronic device, third identity verification information of the user sent by the second electronic device, wherein the third identity verification information is collected by the second electronic device in response to an unlock operation of the user;
 comparing, by the first electronic device, the third identity verification information with the second identity verification information, to obtain a second comparison result; and
 sending, by the first electronic device, based on the second comparison result indicating that the third identity verification information matches the second identity verification information, the interface data to the second electronic device.

12. The method according to claim 10, further comprising:
 determining whether the first electronic device is directly connected to the second electronic device; and
 establishing, based on the first electronic device not being directly connected to the second electronic device, a direct connection between the first electronic device and the second electronic device.

13. The second electronic device according to claim 9, wherein the second identity verification information is encrypted by the first electronic device.

14. The second electronic device according to claim 9, wherein the obtaining the first comparison result between the first identity verification information and the second identity verification information comprises:
 sending the first identity verification information to the first electronic device; and
 receiving the first comparison result between the first identity verification information sent by the first electronic device and the second identity verification information.

15. The second electronic device according to claim 9, wherein the obtaining the first comparison result between the first identity verification information and the second identity verification information comprises:
 receiving the second identity verification information sent by the first electronic device; and
 comparing the first identity verification information with the second identity verification information.

16. The second electronic device according to claim 9, wherein the obtaining the first comparison result between the first identity verification information and the second identity verification information comprises:
 sending the first identity verification information to a third electronic device; and
 receiving the first comparison result between the first identity verification information and the second identity verification information sent by the third electronic device.

17. The second electronic device according to claim 9, wherein the instructions further include instruction for:
 collecting fourth identity verification information of the user in response to the unlock operation;
 comparing the fourth identity verification information with fifth identity verification information pre-stored in the second electronic device to obtain a third comparison result; and
 performing at least one of:
  unlocking, based on the third comparison result indicating that the fourth identity verification information matches the fifth identity verification information, the second electronic device; or
  skipping unlocking, based on the third comparison result indicating that the fourth identity verification information does not match the fifth identity verification information, the second electronic device.

18. The second electronic device according to claim 9, wherein the instructions further include instructions for:
 comparing the third identity verification information with fifth identity verification information pre-stored in the second electronic device in response to the unlock operation, to obtain a fourth comparison result; and
 perform at least one of:
  unlocking, based on the fourth comparison result indicating that the third identity verification information matches the fifth identity verification information, the second electronic device; or
  skipping unlocking, based on the fourth comparison result indicating that the third identity verification information does not match the fifth identity verification information, the second electronic device.

19. The method according to claim 1, wherein the second identity verification information is encrypted by the first electronic device.

\* \* \* \* \*